US008743135B2

(12) United States Patent
Nystad et al.

(10) Patent No.: US 8,743,135 B2
(45) Date of Patent: Jun. 3, 2014

(54) GRAPHICS PROCESSING SYSTEMS

(75) Inventors: Jørn Nystad, Trondheim (NO); Rune Holm, Trondheim (NO)

(73) Assignee: ARM Limited, Cambridge (GB)

( * ) Notice: Subject to any disclaimer, the term of this patent is extended or adjusted under 35 U.S.C. 154(b) by 519 days.

(21) Appl. No.: 12/588,171

(22) Filed: Oct. 6, 2009

(65) Prior Publication Data

US 2010/0097388 A1  Apr. 22, 2010

(30) Foreign Application Priority Data

Oct. 6, 2008  (GB) .................................. 0818279.2

(51) Int. Cl.
*G09G 5/02* (2006.01)

(52) U.S. Cl.
USPC .......................................................... 345/582

(58) Field of Classification Search
USPC .......................................................... 345/582
See application file for complete search history.

(56) References Cited

U.S. PATENT DOCUMENTS

| 4,855,934 | A * | 8/1989 | Robinson ....................... 345/582 |
| 5,133,052 | A | 7/1992 | Bier et al. |
| 5,381,521 | A * | 1/1995 | Ballard .......................... 345/442 |
| 6,281,902 | B1 | 8/2001 | Nagashima |
| 6,552,725 | B1 | 4/2003 | Houtman et al. |
| 7,239,319 | B2 | 7/2007 | Loop |
| 7,277,096 | B2 | 10/2007 | Veach |
| 7,405,733 | B2 * | 7/2008 | Helie et al. ..................... 345/442 |
| 7,432,937 | B2 * | 10/2008 | Poddar et al. .................. 345/592 |
| 7,589,730 | B1 | 9/2009 | Brown |
| 7,629,400 | B2 * | 12/2009 | Hyman .......................... 524/106 |
| 7,657,071 | B2 | 2/2010 | Bartesaghi et al. |
| 7,746,342 | B2 * | 6/2010 | Yamada ......................... 345/423 |
| 7,835,568 | B2 * | 11/2010 | Park et al. ..................... 382/154 |
| 7,868,887 | B1 | 1/2011 | Yhann |
| 8,068,106 | B1 | 11/2011 | Yhann et al. |
| 8,090,160 | B2 * | 1/2012 | Kakadiaris et al. ............ 382/118 |
| 8,300,052 | B1 | 10/2012 | Hetu |
| 2002/0158881 | A1 | 10/2002 | Van Welzen |
| 2003/0179203 | A1 * | 9/2003 | Bruderlin et al. ............. 345/473 |
| 2003/0197708 | A1 | 10/2003 | Frisken et al. |
| 2004/0037467 | A1 | 2/2004 | Wenzel et al. |
| 2004/0068530 | A1 * | 4/2004 | Yamazaki et al. ............ 708/290 |

(Continued)

FOREIGN PATENT DOCUMENTS

CN  101046888 A  10/2007
CN  101051390 A  10/2007

(Continued)

OTHER PUBLICATIONS

Office Action mailed Mar. 19, 2012 in co-pending U.S. Appl. No. 12/588,175.

(Continued)

*Primary Examiner* — Javid A Amini
(74) *Attorney, Agent, or Firm* — Nixon & Vanderhye P.C.

(57) ABSTRACT

A smooth curve is represented in a graphics texture by setting the texels that are inside the curve 1 to a value greater than a predetermined threshold value and the texels that are outside the curve 1 to a value less than the threshold value (or vice-versa).
The texture value returned for a sampled position can thus be used to determine whether the sampled position should be treated as being inside the curve 1 or not.
The texture is optimised for sampling using bi-linear filtering.

24 Claims, 6 Drawing Sheets

(56) References Cited

U.S. PATENT DOCUMENTS

| | | | |
|---|---|---|---|
| 2004/0189662 A1 | 9/2004 | Frisken et al. | |
| 2005/0012746 A1* | 1/2005 | Chen et al. | 345/441 |
| 2005/0017969 A1 | 1/2005 | Sen et al. | |
| 2005/0063582 A1 | 3/2005 | Park et al. | |
| 2006/0017955 A1 | 1/2006 | Owen et al. | |
| 2006/0023933 A1 | 2/2006 | Mitsui | |
| 2006/0133691 A1* | 6/2006 | Neto et al. | 382/276 |
| 2006/0256112 A1 | 11/2006 | Heirich et al. | |
| 2006/0256115 A1 | 11/2006 | Cao et al. | |
| 2007/0002043 A1* | 1/2007 | Guenter et al. | 345/420 |
| 2007/0002053 A1 | 1/2007 | Hill et al. | |
| 2007/0097123 A1* | 5/2007 | Loop et al. | 345/442 |
| 2007/0211061 A1 | 9/2007 | Kokojima | |
| 2007/0229506 A1* | 10/2007 | Sugita et al. | 345/441 |
| 2008/0120075 A1 | 5/2008 | Wloka | |
| 2009/0237401 A1 | 9/2009 | Wei et al. | |
| 2010/0124383 A1* | 5/2010 | Wang et al. | 382/299 |
| 2010/0201695 A1* | 8/2010 | Hill et al. | 345/503 |
| 2011/0109625 A1* | 5/2011 | Yamada | 345/419 |

FOREIGN PATENT DOCUMENTS

| | | |
|---|---|---|
| CN | 101189600 A | 5/2008 |
| EP | 0 624 849 | 11/1994 |
| EP | 0763930 A1 | 3/1997 |
| JP | A 06-274149 | 9/1994 |
| JP | A 06-309417 | 11/1994 |
| JP | H07-006233 | 1/1995 |
| JP | H07-77968 | 3/1995 |
| JP | H11-175740 | 7/1999 |
| JP | H11-296699 | 10/1999 |
| JP | A 2004-054584 | 2/2004 |
| JP | 2007-073043 | 3/2007 |
| JP | A 2007-537815 | 12/2007 |
| WO | WO 2005/088553 A1 | 9/2005 |
| WO | WO 2005/114575 | 12/2005 |
| WO | WO 2007/005537 | 1/2007 |

OTHER PUBLICATIONS

Search Report, Mar. 17, 2009, in corresponding Great Britain Application No. GB0818278.4.
Search and Examination Report, Jan. 19, 2010, in corresponding Great Britain Application No. GB0917510.0.
Taubin, Distance Approximations for Rasterizing Implicit Curves, ACM Transactions on Graphics, vol. 13, No. 1, Jan. 1994, pp. 3-42.
TASI, Vector Graphics Illustrated Glossary, last reviewed Nov. 2006, pp. 1-6.
TASI, An Introduction to the Vector Image Format, last reviewed Mar. 2005, pp. 1-6.
Huang et al., Implementation of an Open VG Rasterizer with Configurable Anti-aliasing and Multi-window Scissoring, Proceedings of the Sixth IEEE International Conference on Computer and Information Technology, 2006 IEEE.
Loop et al., Resolution Independent Curve Rendering using Programmable Graphics Hardware, Copyright 2005 by Association for Computing Machinery, Inc. pp. 1000-1009.
Search and Examination Report, Jan. 19, 2010, in corresponding Great Britain Application No. GB0917511.8.
Search Report, Mar. 12, 2009, in corresponding Great Britain Application No. GB0818277.6.
Search and Examination Report, Jan. 27, 2010, in corresponding Great Britain Application No. GB0917508.4.
Search Report, Mar. 20, 2009, in corresponding Great Britain Application No. GB0818280.0.
Search Report, Mar. 20, 2009, in corresponding Great Britain Application No. GB0818279.2.
Search and Examination Report, Jan. 26, 2010, in corresponding Great Britain Application No. GB0917509.2.
P. Sen, Silhouette Maps for Improved Texture Magnification, Graphics Hardware (2004), pp. 65-73 and 147.
G. Ramanarayanan et al., Feature-Based Textures, Eurographics Symposium on Rendering (2004), 10 pgs.
UK Examination Report dated Apr. 8, 2011 for GB 0917509.2.
U.S. Appl. No. 12/588,172, filed Oct. 6, 2009; Inventor: Nystad et al.
U.S. Appl. No. 12/588,175, filed Oct. 6, 2009; Inventor: Nystad et al.
U.S. Appl. No. 12/588,177, filed Oct. 6, 2009; Inventor: Nystad et al.
Office action mailed Oct. 25, 2012 in co-pending U.S. Appl. No. 12/588,175.
Office action mailed Sep. 17, 2012 in co-pending U.S. Appl. No. 12/588,177.
Office Action mailed Oct. 15, 2013 in U.S. Appl. No. 12/588,175, pp. 1-19.
Office Action mailed Sep. 30, 2013 in U.S. Appl. No. 12/588,172, pp. 1-19.
English Translation of Chinese Office Action mailed Aug. 28, 2013 in Chinese Application No. 200910178763.4.
English Translation of Chinese Office Action mailed Mar. 29, 2013 in Chinese Application No. 200910178762.
English Translation of Chinese Search Report mailed Mar. 29, 2013 in Chinese Application No. 200910178762.
Office Action mailed May 9, 2013 in U.S. Appl. No. 12/588,172.
Office Action mailed May 28, 2013 in U.S. Appl. No. 12/588,175.
English Translation of Chinese Office Action and Search Report mailed Feb. 7, 2013 in Chinese Application No. 200910179578.7.
Z. Su, The Applying Research of Bicubic Patch, Mechanical & Engineering Technology, vol. 32, Issue 6, Dec. 31, 2003, pp. 26-27—No English Translation.
Y. Ke et al., Parallel Scatterplots: Visual Analysis with GPU, Journal of Computer-Aided Design & Computer Graphics, vol. 20, Issue No. 9, Sep. 30, 2008, pp. 1219-1228—Abstract.
United Kingdom Examination Report dated Feb. 27, 2013 in Application No. GB0917509.2.
C. Green, Improved Alpha-Tested Magnification for Vector Textures and Special Effects, published 2007, see whole document, 5 pages.
English Translation of Chinese Office Action mailed Jan. 11, 2013 in Chinese Application No. 200910179092.3.
English translation of Chinese Official Action dated Oct. 18, 2013 in CN Application No. 2009-10179578.7, 4pgs.
English translation of Japanese Official Action dated Nov. 12, 2013 in JP Application No. 2009-231898, 2 pgs.
English translation of Japanese Official Action dated Nov. 19, 2013 in JP Application No. 2009-231900, 4 pgs.
English translation of Japanese Official Action dated Nov. 19, 2013 in JP Application No. 2009-231899, 4 pgs.
Chinese Office Action and English Translation, dated Dec. 3, 2013 in CN Application No. 200910179092.3, 13 pgs.

* cited by examiner a)
Classification
Result: serpentine curve b)
Texture search
Look through the stored serpentine curves for the closest match c)
Texture selection and texture coordinate calculation d)
Rendering using the selected texture

GRAPHICS PROCESSING SYSTEMS

This application claims priority to United Kingdom Application No. GB 0818279.2 filed 6 Oct. 2008, the entire contents of which is hereby incorporated by reference.

The present invention relates to graphics processing systems and in particular to the rendering of smooth shapes, such as smooth curves in graphics processing systems.

The present invention will be described with particular reference to the processing of three dimensional graphics, although as will be appreciated by those skilled in the art, it is equally applicable to the processing of two-dimensional graphics as well.

As is known in the art, 3D graphics processing is normally carried out by first dividing a scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) for display.

Once primitives for a scene and their vertices have been generated and defined, they can be processed by the graphics processing system, in order, e.g., to display the scene on an output display device such as a screen or printer.

This process basically involves determining which sampling points of an array of sampling points covering the scene area to be processed are covered by a primitive, and then determining the appearance each sampling point should have (e.g. in terms of its colour, etc.) to represent the primitive at that sampling point. These processes are commonly referred to as rasterising and shading, respectively.

The rasterising process determines the sample positions that should be used for a primitive (i.e. the (x, y) positions of the sample points to be used to represent the primitive in the scene to be displayed). This is typically done using the positions of the vertices of a primitive.

The shading process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and shading. However, herein "rasterisation" will be used to refer to converting primitive data to sampling point addresses only.)

These processes are typically carried out by "representing" the sampling points as discrete graphical entities usually referred to as "fragments" on which the graphics processing operations (such as shading) are carried out. Each sampling point will, in effect, be represented by a fragment that will be used to shade the primitive at the sampling point in question. A fragment may represent (have associated with it) a single sampling point or plural sampling points. The "fragments" are the graphical entities that pass through the shading process (the shading pipeline).

(A "fragment" is therefore effectively (has associated with it) a set of primitive data as interpolated to a given screen space sample point or points of a primitive. It may also include per-primitive and other state data that is required to shade the primitive at the sample point or points (fragment position) in question. Each graphics fragment can reasonably be thought of as being effectively equivalent to a "pixel" of the scene as it is processed).

Each graphics "fragment" may correspond to a single pixel (picture element) in the final output display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

It is becoming increasingly desirable in graphics processing systems to be able to render smooth shapes, and in particular shapes that are defined by smooth curves (that have a smooth curve as their edge or boundary), effectively and accurately for display. In general a shape with an edge or boundary curve that is continuous and where the first derivative of the curve is piecewise continuous can be considered to be a smooth shape (a shape defined by a smooth curve) from the point of view of graphics processing (and will be considered to be a smooth shape and, correspondingly, a smooth curve, for the purposes of the present invention and application). Examples of such smooth curves in graphics processing are bezier curves, spline curves and arcs.

For example, in recent years it has become increasingly common to utilise so-called "vector graphics" in computer graphics.

Vector graphics are based on the use of individually defined geometrical objects, such as one or more line segments, e.g. straight lines or curves (such as quadratic (bezier) curves, elliptical arcs, cubic (bezier) curves) that are connected together at anchor points to form a path.

Vector graphics objects/paths are usually defined and manipulated in what is known as "user space". However, in order to display the vector graphics objects/paths on a video display or printer, for example, the user-space defined vector graphics must be converted to a format suitable for a pixel-based display, i.e. to a primitive and sampling point-based form. It can be difficult when performing this conversion to retain any smooth curves or shapes of the vector graphics object, because the object must, in effect, be rasterised to the sampling positions and pixels used for displaying the object.

One known technique for rendering smooth shapes for display is to sub-divide the shape into a large number of small linear sections for the rendering process. However, this has high performance costs, for example, in term of CPU time and rendering bandwidth.

Another known technique for rendering smooth curves is to use implicit curves, i.e. to evaluate an implicit equation for determining whether a given sampling point is inside or outside the curve. However, not all smooth shapes can be converted to such an implicit form, and this technique in any event requires dedicated rendering hardware or very high precision fragment shader hardware for evaluating the implicit curves.

The Applicants believe therefore that there remains scope for improved techniques and systems for rendering smooth curves and shapes defined by smooth curves.

According to a first aspect of the present invention, there is provided a method of rendering a shape defined by a smooth curve in a graphics processing system, the method comprising:

applying a graphics texture representing a curve corresponding to the curve defining the shape to a primitive or primitives to be rendered by sampling texture values in the texture for sampling positions within the primitive or primitives; and using the sampled texture values to determine which side of the curve the sampling positions should be treated as being on.

According to a second aspect of the present invention, there is provided an apparatus for rendering a shape defined by a smooth curve in a graphics processing system, the apparatus comprising:

means for storing one or more graphics textures that represent a smooth curve or curves;

means for applying a graphics texture representing a smooth curve to a primitive or primitives to be rendered by sampling texture values in the texture for sampling positions within the primitive or primitives; and means for using a sampled texture value or values to determine which side of the curve a sampling position should be treated as being on.

In the present invention, a shape defined by a smooth curve (i.e., in effect, having the smooth curve as its edge or boundary) is rendered by representing the smooth curve defining the shape as a texture and then applying the texture to an appropriate primitive or primitives. The shape is drawn for display by sampling texture values in the texture and using the sampled values to determine which side of the curve each sampling point is on. This allows the graphics processing system to efficiently determine whether any given point is inside or outside the curve (and thus the shape).

By representing the smooth curve in a texture and then applying it to primitives to draw the shape (curve) in this fashion, the present invention provides a technique that can be used for rendering smooth shapes (and smooth curves) using lower cost, and existing and known texture mapping systems and hardware. Thus, as will be discussed further below, the present invention makes it possible to more efficiently render smooth curves using only "plain" texture mapping. The present invention accordingly facilitates the more effective rendering of smooth shapes (and curves) on lower-cost, e.g., fixed function, graphics hardware, and on unmodified, and traditional, existing fixed-function, graphics hardware, and can avoid the need, e.g., to use the sub-division technique and/or dedicated hardware currently used for smooth curve rendering.

The smooth curve or curves should be represented in the texture(s) such that sampling a texture value for a given position in the texture allows the system to determine which side of the curve that position in the texture is on.

In a particularly preferred embodiment, this is done by configuring the texture such that all texture positions on one side of the curve will return sampled texture values that are less than a particular, preferably selected, threshold value, and all texture positions on the other side of the curve will return sampled texture values that are greater than the threshold value. This means that when the texture is sampled, the sampled texture value can be used to determine whether the sampled point lies inside or outside the curve (i.e. depending upon whether the sampled texture value is greater than or less than (or vice-versa) the curve's threshold texture value).

In these arrangements, the sampled texture values are accordingly preferably used to determine which side of the curve the sampled position is on by comparing the sampled texture value with the threshold value for the curve. This comparison may be a greater than (">") or a greater than or equal to (">=") comparison (or a less than ("<") or a less than or equal to ("<=") comparison). In a preferred embodiment, a greater than or equal to (or a less than or equal to) test is used, as that has been found to work better with the rounding performed by typical graphics processors when using the present invention.

The result of the determination of which side of the curve a sampled position is on (e.g. of the comparison test) is preferably used to control future processing of that sampled position. Preferably, the result of the determination is used to, in effect, retain or discard the sampled position from further processing in respect of the smooth shape (curve), as appropriate. Preferably, if the test shows the sampled position is inside the curve, the corresponding position in the primitive is shaded (e.g. coloured) accordingly, but if it is outside the curve, the position in the primitive is not shaded to have the properties required for the smooth shape in question (e.g., and preferably, is discarded from further processing of the shape).

Thus, in a preferred embodiment, the present invention comprises a step of or means for shading the sampling position(s) in accordance with the results of the determination of which side of the curve the sampling position is on (the results of the comparison test).

Thus, for example, and preferably, points determined to be on the inside of the curve preferably have a particular colour and/or appearance applied to them, and points determined to be on the outside of the curve are allowed to have (and have) a different colour applied to them (e.g. a colour that is determined by some other object or shape in the scene).

In other words, the or each sampling position is preferably shaded (coloured) at least in part according to which side of the curve it has been determined to lie on.

The shading may, e.g., be carried out in the same processing pass as the pass in which the texture is applied, or the results of the texture test may be stored (e.g. in the stencil buffer) and the shading then performed in a later pass. In one preferred embodiment, the shading is carried out in a subsequent pass, as this helps when it is necessary to combine both smooth curves and regular polygons (which might intersect and overlap each other).

Thus according to a third aspect of the present invention, there is provided a method of rendering a shape defined by a smooth curve in a graphics processing system, the method comprising:

applying a graphics texture representing a curve corresponding to the curve defining the shape to a primitive or primitives to be rendered by sampling texture values for sampling positions within the primitive or primitives, the texture being configured such that all positions in the texture on one side of the curve will return a sampled texture value that is less than a selected threshold value and all positions in the texture on the other side of the curve will return a sampled texture value that is greater than the selected threshold value; and when doing so, comparing the sampled texture values for the sampled sampling points of the primitive or primitives to the selected threshold texture value for the curve to determine which side of the curve the sampled sampling point or points of the primitive or primitives should be treated as being on.

According to a fourth aspect of the present invention, there is provided an apparatus for rendering a shape defined by a smooth curve in a graphics processing system, the apparatus comprising:

means for storing one or more graphics textures that represent a smooth curve or curves, each texture being configured such that sampling any position in the texture on one side of a curve that the texture represents will return a sampled texture value that is less than a selected threshold value and sampling any position in the texture on the other side of the curve will return a sampled texture value that is greater than the selected threshold value;

means for applying a stored texture representing a smooth curve to a primitive or primitives to be rendered by sampling texture values for sampling positions within the primitive or primitives; and means for comparing the sampled texture values for the sampled sampling points of the primitive or primitives to the selected threshold texture value for the curve to determine which side of the curve the sampling point or points of the primitive or primitives should be treated as being on.

Similarly, according to a fifth aspect of the present invention, there is provided a method of rendering a shape defined by a smooth curve for display, the method comprising:

generating one or more primitives covering the scene area where the shape is to be displayed;

rasterising the primitive or primitives to generate one or more graphics fragments, each fragment representing a sampling point or points covered by the primitive or primitives;

applying a graphics texture representing a curve corresponding to the smooth curve defining the shape to the fragments, the texture being configured such that sampling any position in the texture on one side of the curve will return a sampled texture value that is less than a selected threshold value and sampling any position in the texture on the other side of the curve will return a sampled texture value that is greater than the selected threshold value, by:

for each fragment, sampling a corresponding position or positions in the texture to determine a sampled texture value or values;

comparing the sampled texture value or values for a fragment with the threshold texture value for the curve; and treating the fragment and/or a sampling position or positions represented by the fragment as being either inside or outside the curve on the basis of the comparison.

According to a sixth aspect of the present invention, there is provided an apparatus for rendering a shape defined by a smooth curve for display, the apparatus comprising:

means for generating one or more primitives covering the scene area where the shape is to be displayed;

means for rasterising the primitive or primitives to generate zero or more graphics fragments, each generated fragment representing a sampling point or points covered by the primitive or primitives;

means for applying a graphics texture representing a curve that corresponds to the smooth curve defining the shape to generated fragments, the texture being configured such that sampling any position in the texture that is on one side of the curve will return a sampled texture value that is less than a selected threshold value and sampling any position in the texture that is on the other side of the curve will return a sampled texture value that is greater than the selected threshold value, by, for each fragment, sampling a corresponding position or positions in the texture to determine a sampled texture value or values;

means for comparing the sampled texture value or values for a fragment with the threshold texture value for the curve; and means for treating the fragment and/or a sampling position or positions represented by the fragment as being either inside or outside the curve on the basis of the comparison.

These aspects of the present invention can and preferably do include any one or more or all of the preferred and optional features of the invention described herein, as appropriate. Thus, for example, the comparison test is preferably a greater than or equal to (or a less than or equal to) test. Similarly, the results of the comparison are preferably stored and used to control shading of the fragment(s) and/or sampling position(s) in a subsequent processing pass (such that the fragment(s) and/or sampling position(s) will effectively be retained or discarded as being inside or outside the curve, accordingly).

In a preferred embodiment of these aspects of the invention, there is a single texture look-up per fragment, and the fragment is discarded (or not) as a consequence of the comparison test.

It should also be noted here that, as is known in the art, it is possible for the primitive(s) covering the scene area where the shape is to be displayed to rasterise to zero fragments, i.e. effectively meaning that the shape will not be seen in the scene as it is displayed. In this case there will be no fragments for the texture to be applied to. However, typically, the primitives will rasterise to one or more fragments (to at least one fragment) and in this case the texture will then be applied to those fragments as set out above.

The textures that are used to represent and for rendering a smooth shape (and curve) in the present invention can be constructed and configured as desired.

In a preferred embodiment, the textures are, as is known in the art, configured as an array of texel values, each texel (texture position) having associated with it a corresponding texture value for that position in the texture map. The texel values of the texels making up the texture should in this arrangement accordingly be selected and set such that when a texture position on one side of a curve that the texture is to represent is sampled, the sampled texture value is less than the selected threshold value for the curve, and vice-versa.

The present invention also extends to the construction of the textures representing the curves and to the textures themselves. It may be, for example, that the textures will be generated (and stored) separately, and/or in advance, and then, e.g., provided to a graphics processor for use. The present invention extends to these activities, as well as to the use of the textures for rendering a smooth shape (and curve).

Thus, according to a seventh aspect of the present invention, there is provided a method of generating a texture for use in a graphics processing system for rendering a shape defined by a smooth curve, the method comprising:

generating a graphics texture map comprising an array of texture texels for representing a smooth curve, by:

setting the texel values in the texture map such that texture samples taken from positions in the texture map that lie on one side of the smooth curve will return texture values that are less than a threshold texture value, and such that texture samples taken from positions that lie on the other side of the smooth curve will return texture values that are greater than the threshold texture value.

According to an eighth aspect of the present invention, there is provided an apparatus for generating a texture for use in a graphics processing system for rendering a shape defined by a smooth curve, the apparatus comprising:

means for generating a graphics texture map comprising an array of texture texels for representing a smooth curve, comprising:

means for setting the texel values in the texture map such that texture samples taken from positions in the texture map that lie on one side of the smooth curve will return texture values that are less than a threshold texture value, and such that texture samples taken from positions that lie on the other side of the smooth curve will return texture values that are greater than the threshold texture value.

According to a ninth aspect of the present invention, there is provided a graphics texture map for use in a graphics processing system for rendering a shape defined by a smooth curve, the texture map comprising:

an array of texture texels, in which:

the texel values are set such that texture samples taken from positions in the texture map that lie on one side of a smooth curve that the texture is to represent will return texture values that are less than a threshold texture value, and such that texture samples taken from positions that lie on the other side of the smooth curve will return texture values that are greater than the threshold texture value.

As will be appreciated by those skilled in the art, all of these aspects and embodiments of the invention can and preferably do include any one or more or all of the preferred features described herein, as appropriate. For example, the generated texture map or maps are preferably stored for future use.

As noted above, in these aspects and embodiments of the invention the texture map representing the curve is configured such that sampled texture points on either side of the curve will give sampled texture values either greater than or less than the curve's threshold value. This means that when the texture is sampled, the sampled texture value can be used to determine whether the sampled point is inside or outside the curve (if the sampled texture value is greater than or less than (or vice-versa) the curve's threshold texture value).

It should be noted here that the aim and intention in all of the aspects and embodiments of the invention is to ensure that all texture positions on one side of the curve will return sampled texture values that are less than the curve's selected threshold value and vice-versa, so as to allow the side of the curve a texture position is on to be readily determined.

However, it may be the case that a sampled texture position will return a value that is equal to the curve's selected threshold value. Indeed, there will typically be a line of texture positions in the texture that will return sampled texture values that equal the curve's threshold value.

These texture positions that return the curve's threshold value when sampled will accordingly form a contour line in the texture (when it is sampled) on which contour line the sampled texture value for any point on that contour will equal the curve's threshold texture value. This contour in the texture (when it is sampled) will therefore effectively represent, and can therefore effectively be considered as representing, the line of the curve as it will be indicated by the texture (when the texture is sampled) (since sampling a texture position on the curve threshold contour will return the curve's threshold value and so, such a position can be viewed as, in effect, lying "on" the curve as it appears in the texture, rather than on one or other side of the curve).

It is accordingly preferred to, as far as possible, configure the texture such that the contour in the texture that corresponds to the threshold value set for the curve matches closely to, and closely represents, preferably as closely as possible, the line of the smooth curve (and thus, in effect, the edge of the smooth shape) that the texture is to represent, as this should then mean that the texture when sampled will more accurately reflect the curve (and shape) it is to represent.

While it would be possible to treat sample texture positions that are "on" the contour having the curve's threshold value (i.e. that return the curve's threshold value when sampled) as a special case (for example, to distinguish the line of the curve when it is rendered), in a preferred embodiment this is not done and any texture samples that equal the threshold value are preferably simply dealt with according to the comparison test being employed (e.g. whether it is a "greater than or equal to" test, in which case points "on" the contour of the curve's threshold value will be treated the same as points that are greater than the threshold value, or a "greater than" test, in which case points "on" the contour of the curve's threshold value will be treated the same as points that are less than the threshold value, and so on).

It should also accordingly be noted here that while in general it will be desirable to configure the texture such that positions on the threshold value contour (line) of the curve in the texture will match closely to, and preferably as close as possible to, the line of the curve that the texture is to represent, there is no need to deliberately configure the sampling of the texture such that points on the threshold value contour will be treated as or identified as a special case. Rather, preferably a test is simply made to see whether a sampled position should be treated as being inside or outside the curve.

So long as the above principles are met, the values allocated to the texels of the texture can be set and configured in any suitable and desired manner. For example, any desired range of texel values, and curve threshold texture values, can be used.

In a particularly preferred embodiment, the texel values are constrained to the range 0 to 1 ([0,1]). In this case, one preferred curve threshold texture value is 0.5, although other values, such as 0.3 or 0.7, etc., could equally be used (and in a preferred embodiment are used). The texel values can be allowed to extend over other ranges, and other threshold values can be used, if desired. Fixed point or floating point format textures (texel values) can be used, as desired.

In one preferred embodiment, all the texels on one side of the curve are set to a value greater than "0.5", such as "1", and all the texels on the other side of the curve are set to a value less than "0.5", such as "0", and the curve threshold value is set to "0.5". This will provide an arrangement in which sampling the texels will indicate which side of the curve the texture position is on.

In a particularly preferred embodiment, the texel values are denoted using more than one bit. This will allow a finer-grained resolution of the texel values in the texture to be used, which may provide more accurate rendering performance. Thus, in a preferred embodiment, a greyscale of texel values is used. Preferably 8-bit or 16-bit values are used.

The Applicants have recognised that the value returned from a texture map for a given texture sample into that texture will depend upon the texture look-up (sampling) process being used, for example, depending upon whether any form of filtering or interpolation is applied when the texture is sampled. For example, for an identical array of texels, a texture sampling process that uses bi-linear filtering may return a different texel value for a given sampling position as compared to a texture look-up that simply takes the value of the nearest texel to the sampling position.

Moreover, the Applicants have recognised that this can be exploited when constructing the textures representing the smooth curve to be used in the present invention to provide a better rendering result. In particular, the Applicants have recognised that if the texel values in the texture representing the smooth curve are tailored or optimised to the texture sampling process (filtering) to be used when the texture is used, more accurate rendering of the smooth shape (and curve) for a given texture resolution can be achieved.

(It should be noted here that it would always be possible to increase the accuracy of the curve rendering by simply increasing the resolution of the texture. However, that may not always be possible or desirable. The tailoring of the texture to the texture sampling technique to be used provides an alternative way of increasing the rendering accuracy without the need to increase the texture resolution and/or can provide a greater increase in effective texture resolution for a given increase in memory usage).

Thus, in a particularly preferred embodiment, the texel values of the texture representing the smooth curve are set or selected in accordance with (on the basis of) the texture sampling process that is to be applied to the texture when it is (to be) used to render the smooth curve. Thus, for example, where bi-linear filtering is to be used when sampling the texture in use, the texel values stored for the texture are preferably selected such that when bi-linear filtering is used to sample a given position in the texture, an appropriate texture value is returned (to indicate whether the point is inside, or outside, the curve).

In other words, the texture representing the smooth curve is preferably tailored to the texture sampling (interpolation) technique to be used. This will improve the rendering result after the texture filtering (sampling).

Thus according to a tenth aspect of the present invention, there is provided a method of rendering a shape defined by a smooth curve in a graphics processing system, the method comprising:

applying a graphics texture representing a curve that corresponds to the curve defining the shape to a primitive or primitives to be rendered, the texture being configured such that all positions in the texture on one side of the curve will return a sampled texture value that is less than a selected threshold value and all positions in the texture on the other side of the curve will return a sampled texture value that is greater than the selected threshold value, the stored values for each texture further being set such that the texture will represent the smooth curve most accurately when the texture is sampled using a particular, selected texture filtering process, by sampling texture values for sampling positions within the primitive or primitives using the particular texture filtering process that the texture is configured for; and when doing so, comparing the sampled texture values for the sampled sampling points of the primitive or primitives to the selected threshold texture value for the curve to determine which side of the curve the sampled sampling point or points of the primitive or primitives should be treated as being on.

According to an eleventh aspect of the present invention, there is provided an apparatus for rendering a shape defined by a smooth curve in a graphics processing system, the apparatus comprising:

means for storing one or more graphics textures that represent a smooth curve or curves, each texture being configured such that sampling any position in the texture on one side of a curve that the texture represents will return a sampled texture value that is less than a selected threshold value and sampling any position in the texture on the other side of the curve will return a sampled texture value that is greater than the selected threshold value, the stored values for each texture further being set such that the texture will represent the smooth curve most accurately when the texture is sampled using a particular, selected texture filtering process;

means for applying a stored texture representing a smooth curve to a primitive or primitives to be rendered by sampling texture values for sampling positions within the primitive or primitives using the particular texture filtering process that the texture is configured for; and means for comparing the sampled texture values for the sampled sampling points of the primitive or primitives to the selected threshold texture value for a curve to determine which side of the curve the sampling point or points of the primitive or primitives should be treated as being on.

Similarly, according to a twelfth aspect of the present invention, there is provided a method of rendering a shape defined by a smooth curve for display, the method comprising:

generating one or more primitives covering the scene area where the shape is to be displayed;

rasterising the primitive or primitives to generate one or more graphics fragments, each fragment representing a sampling point or points covered by the primitive or one of the primitives;

applying a graphics texture representing a smooth curve that corresponds to the smooth curve defining the shape to the fragments, the texture being configured such that sampling any position in the texture on one side of the curve will return a sampled texture value that is less than a selected threshold value and sampling any position in the texture on the other side of the curve will return a sampled texture value that is greater than the selected threshold value, the stored values for the texture further being set such that the texture will represent the smooth curve most accurately when the texture is sampled using a particular, selected texture filtering process, by:

for each fragment, sampling a corresponding position or positions in the texture using the particular texture filtering process that the texture is configured for to determine a sampled texture value or values;

comparing the sampled texture value or values for a fragment with the threshold texture value for the curve; and treating the fragment and/or a sampling position or positions represented by the fragment as being either inside or outside the curve on the basis of the comparison.

According to a thirteenth aspect of the present invention, there is provided an apparatus for rendering a shape defined by a smooth curve for display, the apparatus comprising:

means for generating one or more primitives covering the scene area where the shape is to be displayed;

means for rasterising the primitive or primitives to generate zero or more graphics fragments, each generated fragment representing a sampling point or points covered by the primitive or one of the primitives;

means for applying a graphics texture representing a smooth curve that corresponds to the curve defining the shape to generated fragments, the texture being configured such that sampling any position in the texture that is on one side of the curve will return a sampled texture value that is less than a selected threshold value and sampling any position in the texture that is on the other side of the curve will return a sampled texture value that is greater than the selected threshold value, the stored values for each texture further being set such that the texture will represent the smooth curve most accurately when the texture is sampled using a particular, selected texture filtering process, by, for each fragment, sampling, using the particular texture filtering process that the texture is configured for, a corresponding position or positions in the texture to determine a sampled texture value or values;

means for comparing the sampled texture value or values for a fragment with the threshold texture value for the curve; and means for treating the fragment and/or a sampling position or positions represented by the fragment as being either inside or outside the curve on the basis of the comparison.

These aspects of the present invention can and preferably do include any one or more or all of the preferred and optional features of the invention described herein, as appropriate. Thus, for example, the comparison test is preferably a greater than or equal to (or a less than or equal to) test. Similarly, the results of the comparison are preferably stored and used to control shading of the fragments and/or sampling positions in a subsequent processing pass (such that, the fragment and/or sampling positions will effectively be retained or discarded as being inside or outside the curve, accordingly).

Similarly, in a preferred embodiment of these aspects of the invention, there is a single texture look-up per fragment, and the fragment is discarded (or not) as a consequence of the comparison test.

Correspondingly, according to a fourteenth aspect of the present invention, there is provided a method of generating a texture for use in a graphics processing system for rendering a shape defined by a smooth curve, the method comprising:

generating a graphics texture map comprising an array of texture texels for representing a smooth curve, by:

selecting the texel values to be used for the texels of the texture on the basis of a particular texture filtering process that is intended to be used when sampling the texture; and setting the texel values for the texture such that texture samples taken from positions in the texture map that lie on one side of the smooth curve using the particular texture filtering process will return texture values that are less than a threshold texture value, and such that texture samples taken from positions that lie on the other side of the smooth curve using the particular texture filtering process will return texture values that are greater than the threshold texture value.

According to a fifteenth aspect of the present invention, there is provided an apparatus for generating a texture for use in a graphics processing system for rendering a shape defined by a smooth curve, the apparatus comprising:

means for generating a graphics texture map comprising an array of texture texels for representing a smooth curve, comprising:

means for selecting the texel values to be used for the texels of the texture on the basis of a particular texture filtering process that is intended to be used when sampling the texture; and means for setting the texel values for the texture such that texture samples taken from positions in the texture map that lie on one side of the smooth curve using the particular texture filtering process will return texture values that are less than a threshold texture value, and such that texture samples taken from positions that lie on the other side of the smooth curve using the particular texture filtering process will return texture values that are greater than the threshold texture value.

According to a sixteenth aspect of the present invention, there is provided a graphics texture map for use in a graphics processing system for rendering a shape defined by a smooth curve, the texture map comprising:

an array of texture texels, in which:

the texel values are set such that texture samples taken from positions in the texture map that lie on one side of a smooth curve that the texture represents will return texture values that are less than a threshold texture value, and such that texture samples taken from positions that lie on the other side of the smooth curve will return texture values that are greater than the threshold texture value; and the texel values for the texture are further set such that the texture will represent the smooth curve most accurately when the texture is sampled using a particular, selected texture filtering process.

As will be appreciated by those skilled in the art, all of these aspects and embodiments of the invention can and preferably do include any one or more or all of the preferred features described herein, as appropriate.

In these aspects and embodiments of the invention, the texture can be configured for use with any desired texture filtering process. Most preferably, the particular, selected, texture filtering process is an interpolation process, i.e. a filtering process that will interpolate texture values for positions that lie between texels. In general it will be possible to tailor the texel values in the texture to match any texture interpolation (filtering) technique for which the interpolation weights and co-ordinates at any given sampling position are predictable for a particular texel. Thus, in general, any isotropic interpolation process could be used. Thus, for example, the texture could be, and in one preferred embodiment is, tailored (optimised) for use with tri-linear filtering. This would then allow, e.g., the textures representing the smooth curves to be provided in the form of mipmaps.

In a particularly preferred embodiment, the texture representing the smooth curve is tailored (optimised) for sampling using bi-linear filtering. Bi-linear filtering is a commonly available texture sampling technique that also exists in "low-cost", fixed function graphics hardware, and so tailoring the present invention for use with bi-linear filtering enhances its applicability to graphics processors and to lower-cost graphics processing hardware in particular.

Thus, in a particularly preferred embodiment, the values of the texels stored in the texture map representing the smooth curve are selected on the basis that bilinear filtering will be used to sample the texture (i.e. such that when bi-linear filtering is used to sample a position in the texture, an appropriate texture value is returned). Similarly, the texture is preferably sampled using a bi-linear filtering technique when it is being used to render a smooth shape.

Where some form of interpolation or filtering function, such as bi-linear filtering is to be used to sample the texture, then preferably the texels of the texture have a bit resolution greater than 1 (i.e. each texel has multiple bits available to represent its value), such as 8-bit or 16-bit texel values. This will allow finer-grained resolution of the texel values, and when combined with a corresponding texture filtering process can allow, for example, the returned sampled position values to match the true contour of the curve more closely.

It should also be noted here that where the texture is to be sampled using some form of filtering or interpolation process, then while the value of texels on a given side of the curve will always be greater than (or less than, respectively) the curve's threshold value, around the threshold value contour of the curve in the texture it can be that texels closer to that contour will have higher (or lower, respectively) values than texels that are on the same side of the curve, but further from the threshold value contour of the curve.

This is because in order for the desired texture value to be returned when a texture position around the line of the curve is sampled using the filtering process, such as bi-linear filtering, it may be necessary for texels on a given side of the curve to have varying values for their side of the curve. Indeed, there may in general be some variation over a range of texel values around the threshold value contour of the curve, even though the texel values may be uniform at greater distances from the curve's threshold value contour.

Thus, in a particularly preferred embodiment, the texture is constructed such that the texel values in the vicinity of the threshold value contour of the curve vary over a range of values, but texels on a given side of the curve at a greater distance from the threshold value contour of the curve each have the same texel value. The extent of the range around the threshold value contour of the curve over which the texel values will vary will depend, e.g., on the size of the filter kernel to be applied when the texture is sampled. Preferably, and for example in the case of bi-linear filtering, the texel values vary for a distance of up to two or of up to four texels on each side of the threshold value contour of the curve.

Most preferably all the texels at a greater distance from the threshold value contour of the curve are set on one side of the curve to a given value greater than the curve's threshold value, such as "1", and all the texels at a greater distance from the contour on the other side of the curve are set to a given value that is less than the curve's threshold value.

Similarly, it is preferred that texels close to the threshold value contour of the curve and on the side of the curve that is to be denoted by texture values less than the curve's threshold value can and do have texel values that are even lower than the texels further from that contour of the curve on that side of the curve, and vice-versa.

The texture (some or all of the texel values used for the texture) can be optimised or tailored to the texture sampling process to be used, and so that the curve is represented most accurately for that sampling process, in any desired and suitable fashion.

Preferably, the values in the texture are set (calculated) so as to minimise the sum of the (local) errors after sampling with the selected texture sampling process. Thus, in the case of bi-linear filtering, for example, the values used in the texture are preferably set so as to minimise the sum of the (local) errors after bi-linear filtering, rather than, e.g., necessarily aiming to have the correct values at the texel centres.

In a particularly preferred embodiment, the texel values to use are determined and selected (set) by deriving a cost function that can be used to represent the sampling process and then minimising that cost function using one or more optimisation algorithms, such as simulated annealing.

Thus, according to a seventeenth aspect of the present invention, there is provided a method of generating a texture for use in a graphics processing system for rendering a shape defined by a smooth curve, in which texture the texel values are to be set such that texture samples taken from positions in the texture map that lie on one side of a smooth curve that the texture is to represent will return texture values that are less than a threshold texture value, and such that texture samples taken from positions that lie on the other side of the smooth curve will return texture values that are greater than the threshold texture value, the method comprising:

determining a set of texel values to use for the texture by minimising a cost function that is representative of respective errors between the position of the curve as it lies in the texture and the indicated position of the curve when the texels of the texture are sampled using a particular texture sampling process.

According to an eighteenth aspect of the present invention, there is provided an apparatus for generating a texture for use in a graphics processing system for rendering a shape defined by a smooth curve, in which texture the texel values are to be set such that texture samples taken from positions in the texture map that lie on one side of a smooth curve that the texture is to represent will return texture values that are less than a threshold texture value, and such that texture samples taken from positions that lie on the other side of the smooth curve will return texture values that are greater than the threshold texture value, the apparatus comprising:

means for determining a set of texel values to use for the texture by minimising a cost function that is representative of respective errors between the position of the curve as it lies in the texture and the indicated position of the curve when the texels of the texture are sampled using a particular texture sampling process.

As will be appreciated by those skilled in the art, all of these aspects and embodiments of the invention can and preferably do include any one or more or all of the preferred features described herein, as appropriate. Thus, for example, the texture is preferably intended to be sampled using bi-linear filtering.

In these aspects and embodiments of the invention, the optimisation of the texel values is preferably carried out by establishing a cost function that includes the texel values as variables, and then attempting to minimise that cost function and selecting the texel values accordingly.

In a particularly preferred embodiment, some or all of the texel values to use are determined by (the cost function for deriving the texel values to use is established by) considering the path of the curve between texels in the texture and trying to optimise the values of some or all of the texels so as to return (as far as possible) the threshold texture value for the curve at the points where the path of the curve lies between the texels (as this should then ensure that the threshold value contour in the texture matches, so far as possible, the path (line) of the curve in the texture (through the texel array of the texture)).

In a particularly preferred such embodiment, particularly where the texture representing the curve is to be optimised for bi-linear filtering, some or all of the texel values to use are determined by (the cost function for deriving the texel values to use is established by) considering the path of the curve (in the texture) between respective pairs of adjacent texels and trying to optimise the values of the texels in the pair to return the threshold texture value at the point where the curve intersects the line joining the pair of texels.

Thus, in a particularly preferred embodiment, the cost function is generated by breaking the path (line) of the curve (through the texel array) into a series of intersections of the path (line) of the curve with lines joining respective texel centres and then trying to adjust the respective texel values so as to produce the desired curve threshold value at the intersection point of the curve with the line joining the respective two texel centres.

This is preferably repeated for each appropriate respective pair of texels and the overall cost function (optimisation) for all the pairs of texels determined as a sum of the individual cost functions of each texel pair.

Thus, in a particularly preferred embodiment, the texel values to use for the texture are determined using a global cost function which is the sum of local cost functions determined in respect of each relevant texel pair (preferably each (and only each) texel pair that straddles the path (line) of the curve in the texture (in practice, effectively the threshold value contour in the texture) (since that contour is intended to match the path of the curve)), and then using a global optimisation method to try and find a configuration that minimises the global (overall) error (which in this arrangement will be the sum of the local (individual texel pair's) errors).

In these arrangements (and in general), the local cost function (the adjustment of the two texel values) for each respective texel pair is preferably viewed as a series of interconnected optimisation problems.

For the cost function (optimisation) for each texel pair, preferably an or the aim (cost consideration) is to minimise the difference between the actual crossing (intersection) point of the curve on the line joining (between) the pair of texels and the crossing point that will be indicated when the texel values are sampled. (Ideally, sampling the texel values should indicate the true crossing point of the curve, but this may not always be possible, so the aim is to minimise this error.)

This factor is preferably taken account of by including in the cost function the error between the actual crossing point position, and the position as indicated by the texel values.

It is also preferred for the cost function to be configured such that the texel values it produces will use as much of the, and preferably the entire, range (e.g. greyscale) of texel values (e.g. [0,1]) that are available (for the curve being represented in the texture). This will help to ensure that the threshold value contour of the curve is defined with a higher resolution.

This is preferably achieved, particularly in the above arrangements, by setting the cost function such that the difference in the texel values of the texel pair being considered will reflect the angle that the curve forms relative to the line joining the pair of texels in question. For example, if the curve is perpendicular to the line between the two texels, then, ideally, the difference between the texel values should be equal to the entire available (allowed) range of texel values (e.g. "1"). On the other hand if the curve is parallel to the line between the two texels, the difference in the texel values should be "0" (zero).

In a preferred embodiment the cost function uses the sine of the angle between the curve and the line between the two texels as a factor to account for and to try to achieve this.

It is also preferred for the cost functions to be configured to apply less weight to edges where the curve is almost parallel to the line between the pair of texels, as in this case any "errors" when sampling the texel values will not tend to distort the position of the curve as much. This is preferably done by including a factor relating to the square of the sine of the angle between the curve and the line between the texels in the cost function, so as to weight the derived "cost" values appropriately.

This cost function is preferably derived and applied in relation to each appropriate respective pair of texels, and the cost function for each respective pair of texel values defined in this form summed over all the texel pairs being considered (tested), to give an overall or "global" cost function for the overall curve (texture), which is then minimised using an optimisation algorithm to derive the texel values to use for the curve in question (to find the optimum texel values to use for each texel pair). Any suitable optimisation process can be used, although simulated annealing is preferred.

The determined texel values are preferably then stored as a graphics texture representing the smooth curve.

Preferably the cost function in respect of the curve is assessed (and the texel values set accordingly) only in respect of those texels (texel pairs) that will affect the indication of the position of the path of the curve (the threshold value contour) when the texture is sampled (e.g. and, preferably, the respective pairs of (immediately) adjacent texels that span or straddle the position of the threshold value contour (i.e. which the path of the curve in the texture passes between)). This is because the other texels (further from the threshold value contour) should not affect the determined indicated position of that contour when the texture is sampled (e.g., and in particular, if bi-linear filtering is used to sample the texture) and can therefore simply be set to a value either above or below the curve's threshold value accordingly, depending on their location.

Thus, in a particularly preferred embodiment, the cost function is used to determine (only) the texel values for texels near to a curve's threshold value contour, preferably (only) for the texels adjacent to the curve's threshold value contour, and most preferably (only) for the pairs of immediately adjacent texels that span or straddle the curve's threshold value contour, with the remaining texels (i.e. the texels further from the line of the curve (the threshold value contour)) simply being set to values that are above or below the curve's threshold value, respectively (rather than using a cost function to derive the values to use for those texels).

Similarly, in a preferred embodiment, as discussed above, the path of the curve in the texture is, in effect, broken into a series of intersections of the curve between respective pairs of texels that straddle the curve, with the adjustment of the two texel values of each pair being treated as a series of interconnected optimisation problems, with any texels further from the curve being set to a value that is above or below a selected threshold value for the curve, as appropriate.

It is similarly particularly preferred that the optimisation or tailoring of the texture to a particular texture sampling (filtering) process (the setting of the texel values on the basis of an intended texture sampling process), is performed (and the texel values set accordingly) only in respect of those texels that will affect the indication of the position of the threshold value contour when the texture is sampled (e.g. and, preferably, the respective pairs of (immediately) adjacent texels that span or straddle the position of that contour (i.e. which the contour passes between)). This is because, as discussed above, the other texels (further from the threshold value contour) should not affect the determined indicated position of that contour when the texture is sampled and can therefore simply be set to a value either above or below the curve's threshold value accordingly, depending on their location.

Thus, in a particularly preferred embodiment, only some but not all of the texel values are specifically set on the basis of the texture sampling process to be used. Most preferably only the texel values for texels near to a curve's threshold value contour, preferably (only) for the texels adjacent to the curve's threshold value contour and most preferably (only) for the pairs of immediately adjacent texels that span or straddle the curve's threshold value contour are specifically set on the basis of the texture sampling process to be used (in the case where the texture is to be sampled using bi-linear filtering at least; other types of filtering may require other texels to be set), with the remaining texels (i.e. the texels further from the line (threshold value contour) of the curve) simply being set to values that are above or below the curve's threshold value, respectively, as discussed above.

Once a texture representing a smooth curve has been created, then it can be, and preferably is, stored for future use to render the curve (a shape defined by the curve (having the curve as its edge (boundary))).

The actual use of a texture of the present invention to render the shape defined by the smooth curve that it represents can be done using, for example, any suitable graphics texture mapping process.

As discussed above, in a particularly preferred embodiment, the texture is used to render a smooth shape for display by first generating a primitive or primitives covering the scene area where the shape is to appear, and then applying the texture to the primitive or primitives and shading the primitive or primitives accordingly.

The primitive or primitives may be generated as desired, for example by defining bounding boxes covering the scene area where the shape to be drawn is to appear.

It may be necessary when generating the primitives to ensure that the generated primitive(s) only sample the desired (and appropriate) areas of the texture. (This may particularly be the case where, as will be discussed further below, multiple curves are represented in the same texture.) This may be achieved, where necessary, as desired. In a preferred embodiment, primitives that cover the convex hull of the control points for the input curve (shape) to be rendered are generated to try to ensure this. (If necessary, e.g., where one of the two end-points isn't part of the convex hull, the input curve (shape) may be split in two so as to ensure that the line between the two end-points is part of the convex hull.)

The generated primitives are then be rasterised to sampling points and fragments generated, and the texture representing the curve applied to each sampling point (and/or fragment) of the primitive or primitives by sampling positions in the texture corresponding to the primitive sampling point (and/or fragment) positions, as is known in the art. (As discussed above, the texture should be sampled using the appropriate texture filtering process, such as, and preferably, bi-linear filtering.)

The sampled texture values are then compared with the threshold value set for the curve in question and the corresponding sampling position(s) and/or fragment(s) retained or discarded accordingly.

This "compare and discard" can be carried out in any desired and suitable manner for the graphics processing system in question.

For example, with a graphics processing system that has fixed function hardware, the alpha test, with the alpha value set to the curve threshold value (e.g. 0.5), could be and is preferably used to compare the sampled texture values and to discard sampling points outside the curve. With a graphics processing system that has programmable fragment shader hardware, a compare and conditional discard routine could be, and preferably is, used.

In a particularly preferred embodiment, a given shape (curve) to be drawn is split into two or more separate shapes (curves), and each different part of the shape (curve) is then rendered separately (e.g. using different curve-representing textures or different parts of the same curve texture).

In one preferred embodiment this is done to split shapes defined by curves that have singular points (curves that contain cusps), at the singular point (or points), so as to draw the part of the curve (shape) on each side of the singular point(s) of the curve (geometry) separately. This arrangement can remove the need to have singular points in a curve lie exactly on the texel grid lines in the texture(s) (as discussed below).

(It would also be possible, where a curve to be represented by a texture has a singular point (or points), to configure the texture such that the singular point(s) in the curve lies exactly on the grid lines joining the centres of the texels of the texture (and in one preferred embodiment, this is done). This will ensure that the discontinuous derivative of the singular point lies on the texel "grid" and so may remove the need to split the curve at the "singular point".)

It may also be desirable to split very large shapes into smaller shapes for the rendering process, e.g., to help reduce the number of rendering artefacts.

Similarly, self-intersecting shapes, such as shapes defined by curves with loops in them, could be split into two (or more) shapes that are not self-intersecting, and then be drawn (rendered) separately, so as to facilitate using the techniques of the present invention for such shapes.

In a particularly preferred embodiment, plural different textures, each representing different curves and/or different parts of a given curve, are generated and stored. Then for any given shape (curve) to be drawn, the texture most appropriate to that shape (curve) can be identified and selected, and used to render the shape (curve). By representing a suitable range of curves in textures, then it should be possible to render almost any arbitrary curved shape.

Indeed, the Applicants have recognised that in practice most if not all curve sections that it may be desired to draw will fall into one of a few families of curves, and so it is possible to represent most if not all of the curves that it may ever be desired to draw using relatively few textures.

In a preferred embodiment, plural different curves are stored in the same texture map. This may be done, for example, by spatially separating the curves in the texture, and then sampling the appropriate area in the texture for the curve in question.

Where the present invention is to be used, then preferably the texture or textures representing the smooth curve or curves is or are generated in advance, and then suitably stored for use by the graphics processing system, e.g., and preferably, along with other (static) texture maps that the graphics processing system will use. A given application can then call for the texture to be applied when the smooth curve in question (a shape defined by the smooth curve in question) is to be drawn.

The smooth shapes and smooth curves that are represented in a texture in the present invention can comprise any suitable and desired such shapes and curves. As discussed above, in a particularly preferred embodiment the or each smooth curve is a curve that is continuous and for which the first derivative of the curve (of the path of the curve) is piecewise continuous. Preferably it is also or instead a bezier curve, a spline curve, and/or an arc.

Similarly, the shapes defined by a smooth curve that the present invention is applicable to (and applied to) can be any shape that has a suitable smooth curve as its edge or boundary. Thus, the smooth shapes that are represented in a texture (and rendered using a texture) in the present invention can and preferably do comprise any shape that has as its edge (boundary) a curve that is continuous and for which the first derivative of the curve (of the path of the curve) is piecewise continuous. Preferably the curve defining the shape (defining the edge of the shape) is a bezier curve, a spline curve, and/or an arc.

The Applicants have further recognised that all curves within certain families of curves can be transformed using an affine transformation onto at least a portion of a predefined, single or fundamental reference curve, referred to herein as a "canonical curve". For example, in the case of quadratic curves, any given quadratic curve can be transformed using an affine transformation to the fundamental quadratic curve, $y=x^2$, which accordingly is the "canonical" curve that can be used for quadratic curves.

This therefore allows information about a single curve, i.e. the canonical curve, to be used to determine information about a plurality of smooth curves that may define smooth shapes that are received by the graphics processing system for rendering. In other words, instead of, for example, having to derive or store data in relation to each individual smooth curve that may define a smooth shape that could be received by the graphics processing system to be rendered, it is only necessary to derive or store data about the canonical curve. This data can then be used to render shapes defined by each of the individual smooth curves that belong to the family (set) of smooth curves that the "canonical curve" represents.

Thus, in a particularly preferred embodiment textures that represent one or more and preferably plural reference or "canonical" curves are generated and used.

It will be appreciated by those skilled in the art that a given input smooth curve defining a shape to be rendered may not match exactly to the profile of the corresponding smooth curve as it is represented and stored in the texture, for example if the curve defining the shape to be drawn does not match exactly the orientation of the curve as it is represented in the texture. For example, the input shape (curve) may be rotated or scaled relative to the curve as it is represented in the texture. In these cases, the curve(s) inscribed in the texture will need to be mapped appropriately onto the shape (curve) to be displayed, so as to correctly draw the input shape (curve) as it is to appear on the display.

Such transformation can preferably include using an affine transformation to match the texture to the shape (curve) to be drawn. Thus, in a preferred embodiment, the present invention comprises transforming the texture such that it can be mapped to the shape (curve) to be drawn, before applying the texture.

The process of mapping the curve(s) as they are represented in the textures onto a shape (curve) to be drawn can be carried out in any suitable and desired manner. In a preferred embodiment, the process of mapping the curves inscribed in textures onto the image to be displayed is done by calculating the texture coordinates for the control points defining the input curve to be drawn (the curve defining the shape to be drawn) and then linearly interpolating the texture coordinates over the curve (e.g. using the interpolation hardware of the graphics processor).

The texture coordinates at the control points can be determined as desired, and different methods may be used for different types of curves, if desired.

For example, in the case of a quadratic curve, each input curve should be just an affine transformed version of the curve stored in the texture. By using the entire curve each time, fixed texture coordinates can be used for each of the control points, and the necessary transform implicitly defined by pairing control points in surface space with the texture coordinates (in texture space).

For cubic curves, the curve is preferably first classified as a serpentine, loop, cusp, "cusp-at-infinity" (i.e. a curve with a cusp with an inflection point infinitely far away), degenerate, or parabola curve. A parabola curve is a quadratic curve and is preferably handled as such. A degenerate curve is preferably handled by splitting it into one or more lines.

For the other curves, the inflection points (infl0 and infl1) of the curve are preferably calculated. Then, if the stored curves are configured so that their inflection points are always at −1 and 1, the linear transformation from [infl0 . . . infl1]→ [−1 . . . 1] can be calculated. With this, the parametric location of the start and end point (0 and 1) of the input curve can be transformed to their locations in the texture space. The parametric range in the canonical texture space that the texture needs to cover is now known.

For loop curves and serpentine curves, the stored textures are then searched to find a texture (e.g. the most zoomed-in texture) that covers the parametric range needed. (This is not necessary for cusp and cusp-at-infinity curves.)

The stored curve (with inflection points at −1 and 1) is preferably then rescaled to map the inflection points to the inflection points of the input curve, infl0 and infl1. This transformation is preferably then applied to the control points of the stored curve to give the appropriate transformed control point positions, which can then be and preferably are used as texture coordinates for the corresponding control points of the input curve.

Where multiple curves are packed into a texture, it may be necessary to apply a transformation to the texture coordinates so as to sample the correct subset of the texture. This is preferably done by calculating the scaling and translation required to transform the "input" box to the "box" that covers the desired part of the stored texture (i.e. that transforms $[0 \ldots 1] \times [0 \ldots 1] \rightarrow [u\_1 \ldots u\_2] \times [v\_1 \ldots v\_2]$) and then applying the determined transformation to texture coordinates that have been calculated as if the curve covered the entire texture.

As will be appreciated from the above, in a preferred embodiment of the present invention the graphics processing system will receive an input shape defined by a smooth curve (i.e. having a smooth curve as its edge (boundary)) to be rendered for display. The graphics processing system will then identify a texture that represents a curve corresponding to the curve defining the shape to be rendered, derive any necessary mapping or transformation required to match the curve as represented and defined in the texture to the curve that defines the shape to be rendered, and then, using any derived necessary transformation or mapping, use the texture representing the curve that corresponds to the curve defining the shape to be rendered to render the shape in the manner of the present invention.

As will be appreciated from the above, the present invention can effectively draw a shape that has the smooth curve defined in the texture as its edge or boundary (since points on one side of the curve are drawn differently to points on the other side of the curve). The present invention therefore can effectively be used to render shapes that have the relevant curve as their edge or boundary, and/or that have the relevant curve as a contour or boundary (i.e. such that points on different sides of the curve should be drawn differently).

In effect, the present invention can be used to identify points on either side of the curve defining (representing) the edge of the shape, thereby allowing the shape to be drawn efficiently. Thus, the textures that are used in the present invention can be viewed as representing a (the) curve that defines an edge or contour of a shape to be rendered.

Thus the present invention can be used to render any shape (a smooth shape) that has an edge and/or contour curve that is continuous and where the first derivative of the edge or contour curve is piecewise continuous (i.e. shapes that are defined by smooth curves that the present invention can be used to render).

(The textures and techniques of the present invention could also, of course, be used to, in effect, draw the curves themselves, if that was desired, as they do also define the curves themselves.)

In a particularly preferred embodiment, the various functions of the present invention are carried out on a single graphics processing platform that generates and outputs the data that is written to the frame buffer for the display device.

The present invention is applicable to any form or configuration of renderer, such as renderers having a "pipelined" arrangement (in which case the renderer will be in the form of a rendering pipeline). In a preferred embodiment it is applied to a hardware graphics rendering pipeline. The various functions and elements, etc., of the present invention can be implemented as desired, for example, and preferably, by appropriate functional units, processing logic, processors, microprocessor arrangements, etc.

The present invention is applicable to all forms of rendering, such as immediate mode rendering, deferred mode rendering, tile-based rendering, etc. In one preferred embodiment it is used in and for deferred mode rendering and tile-based renderers.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

The invention similarly extends to a 2D graphics processor and to 2D graphics processing.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

As discussed above, the basic premise of the present embodiment is to represent a smooth curve in a texture, such that sampling the texture on one side of the curve will give a sampled texture value lower than a particular threshold value, and sampling the texture on the other side of the curve will give a sampled texture value that is greater than the particular threshold value.

Figure 1:
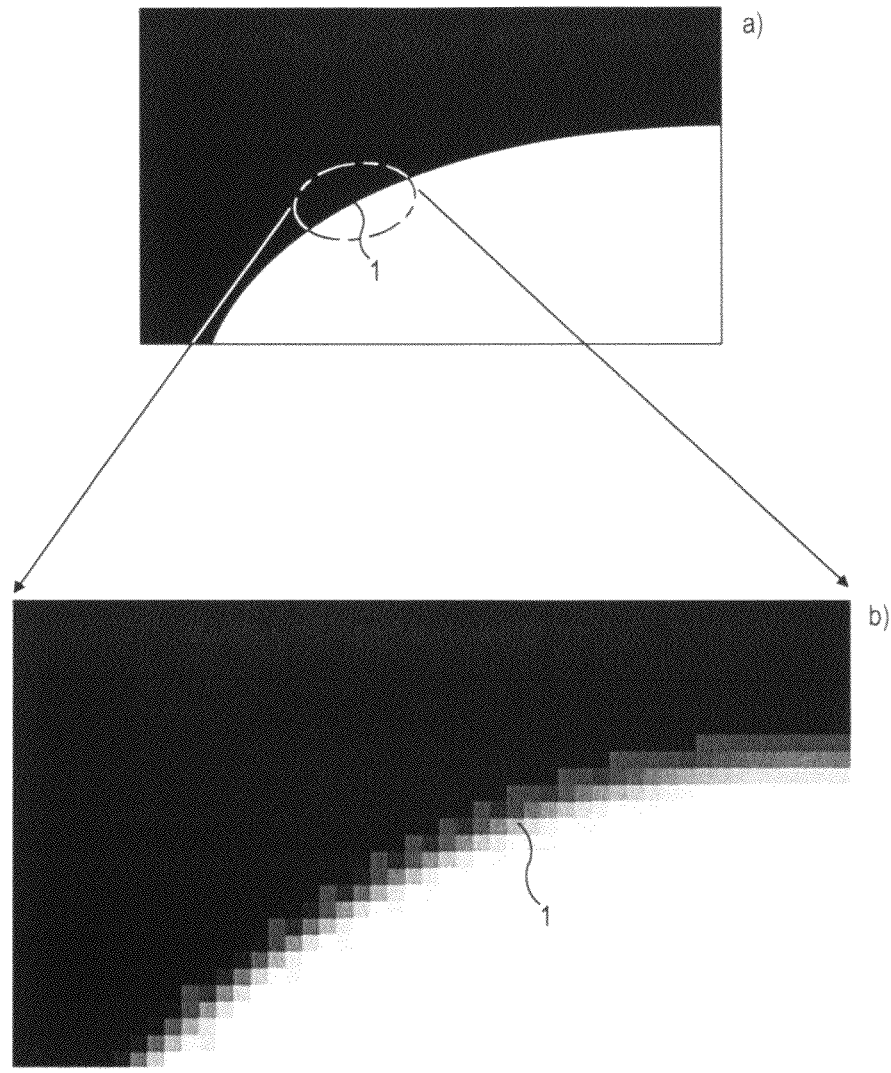
FIG. 1 shows schematically an embodiment of a representation of a smooth curve in a texture that is in accordance with the present invention.

FIG. 1 shows a first embodiment of such a texture for representing a smooth curve 1.

FIG. 1a) shows the overall texture at a lower resolution and basically illustrates the principle of having texture positions to each side of the curve 1 set to, and return, different texture values. FIG. 1b) shows an enlarged view of the texture of FIG. 1a) around the line of the curve 1 as it appears in the texture, and shows, in particular, how the texel values vary in the vicinity of the curve 1 as it appears in the texture.

As shown in FIG. 1, texels that are inside the curve 1 are set to a value of greater than "0.5" (a value of "1" is shown as white in FIG. 1) and texels that are outside the curve 1 are set to a value of less than "0.5" (a value of "0" is shown as black in FIG. 1). Thus, when a sampling position in the texture is looked up, the texture value returned for the sampled position can be used to determine whether the sampled position should be treated as being inside the curve 1 or not. In effect, the threshold value for the curve 1 can be considered to be 0.5.

(It will be appreciated that the texture shown in FIG. 1 can equally be used to draw the "reverse" or inverse curve or shape, so that "black" is treated as being "inside" the curve and "white" is treated as being outside the curve. Indeed, in a preferred embodiment, the graphics system is configured so as to be able to do this. This may be done, e.g., by subtracting the sampled texture value from twice the threshold value for the curve (i.e. by taking 2*threshold (which will give 1.0 in the present case)—sampled_texture_value) and then comparing that value with the threshold value (which will, in effect, "flip" the meaning of the texture).)

The texture shown in FIG. 1 is an 8-bit texture (i.e. uses 8-bits to represent each texel value). Each texel has a single value associated with it (and so the texture may conveniently be a single channel texture).

In this embodiment, the texels in the texture are allowed to have values falling in the range 0 to 1 (inclusive), and the threshold value for the curve contour is set to 0.5. Other arrangements are, of course, possible.

The texture shown in FIG. 1 is also, as will be discussed further below, optimised for sampling using bi-linear filtering.

(As is known in the art, bi-linear filtering is a way of interpolating values for positions in a texture map from the values assigned to texels of the texture map. It can be viewed as a convex combination of the four nearest texels to the sampling position with co-efficients derived from barycentric coordinates:

bilinear $(s,t) = (1-s)(1-t)$ texel$_{i,j}$ + $s(1-t)$ texel$_{i+1,j}$ + $(1-s)t$ texel$_{i,j+1}$ + $st$ texel$_{i+1,j+1}$ where (s, t) are the coordinates of the sampling position in question and texel$_{i,j}$, etc., are the four closest texels to that position.)

As discussed above, the Applicants have recognised that by optimising the texture representing the curve for sampling using bi-linear filtering, the sampling process when the texture is used can and will produce a better representation of the curve in question.

The optimisation of the texture shown in FIG. 1 for use with bi-linear filtering is carried out in this embodiment by establishing a cost function that includes the texel values as variables, and then attempting to minimise that cost function and selecting the texel values accordingly.

In the present embodiment, the cost function is generated by breaking the path (line) of the curve into a series of intersections of the path of the curve with lines joining respective texel centres and then trying to adjust the respective texel values so as to produce the desired curve threshold value at the intersection point of the curve with the line joining the two texel centres.

Figure 2:
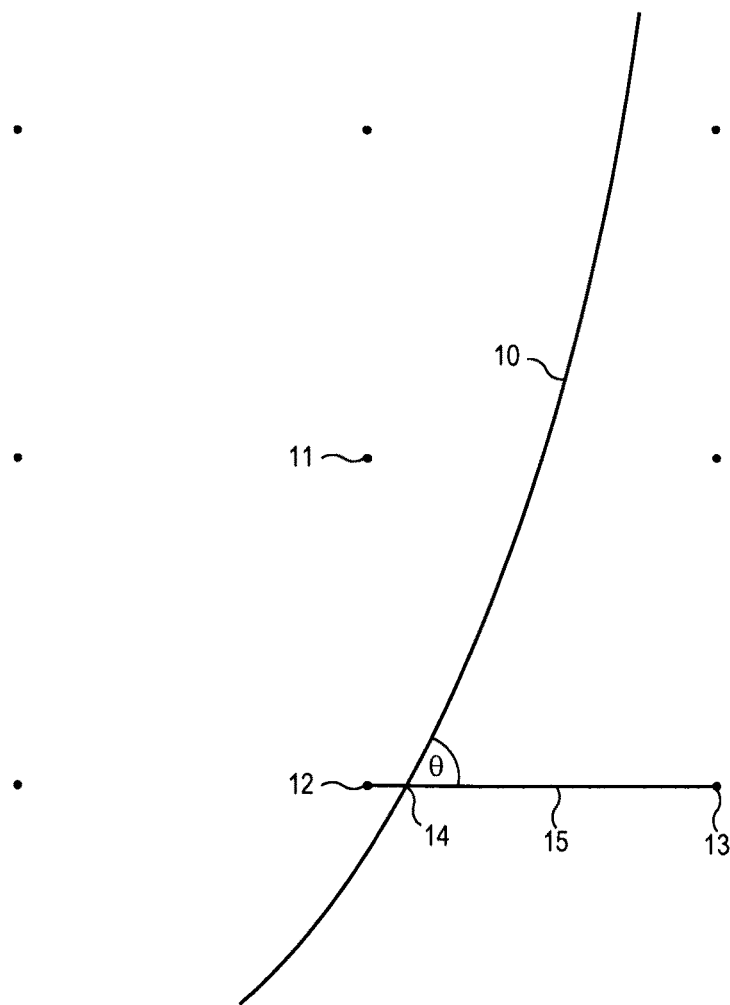
FIG. 2 shows schematically an embodiment of the derivation of the texel values to be used in the texture of FIG. 1.

FIG. 2 illustrates this and shows an exemplary grid of texels 11 with a smooth curve 10 passing through them. If the texels 12, 13 are considered, then ideally their respective texel values should be set such that if the texture is bi-linearly sampled at the point 14 where the curve 10 intersects the line 15 joining the texels 12, 13, then the sampled texture value should exactly equal the threshold texture value for the curve (which in this embodiment is 0.5).

However, each texel may participate in more than one texel pair whose values need to be optimised in this manner, and so it may not always be possible to set the texel values to the exact values that would produce the desired result in respect of any given pair of texels.

The texel values to use for the texture are therefore determined by using a global cost function which is the sum of local cost functions determined in respect of each relevant texel pair (in practice each texel pair that straddles the path (line) of the curve in question (in practice this is also each texel pair that straddles the contour in the texture having the curve's threshold value) and then using a global optimisation method to try and find a configuration that minimises the global (overall) error, to try to find the optimum texel values to use.

The local cost function (the adjustment of the two texel values) for each respective texel pair is viewed in the present embodiment as a series of interconnected optimisation problems as follows.

First, as discussed above, one aim is to minimise the difference between the actual crossing point 14 of the curve on the line 15 joining the pair of texels, and the crossing point as determined by the texel values (i.e. the point on the line 15 where bi-linearly sampling values of the texels 12, 13 will give a sample value equal to the defined curve threshold value (in this case 0.5)). This factor is taken account of by including in the cost function the error between the actual crossing point position, and the position as indicated by the texel values.

Secondly, the cost function is configured so that the resulting differences in the texel values will reflect the angle θ at which the curve 10 crosses the line 15 joining the pair of texels. This is so as to try to ensure that if the curve 10 is perpendicular to the line 15, the difference between the texel values 12, 13 is the maximum it can be (1 in the present case) and if the curve 10 is almost parallel to the line 15, the difference between the texel values 12, 13 should be close to 0 (zero). This helps to ensure that the texels can be allocated (will use) the entire range of available texel values (0 to 1 in this case), thereby defining the curve with a higher resolution.

In the present embodiment, this is achieved by using the sine of the angle θ between the curve 10 and the line 15 joining the texels as a factor in the cost function.

Finally, it is less important to position the crossing point 14 for the curve 10 accurately where the curve is almost parallel to the line 15 between the texels (as any error in the crossing point when the texture is sampled will in this case be less detrimental). This is allowed for in the present embodiment by using a factor related to the square of the sine of the crossing angle θ to weight the edges in the cost function.

The cost function for each respective pair of texel values defined in this form is then summed over all the pairs of texel values being considered, to give a "global" or overall cost function for the overall curve.

This results in the present embodiment in a cost function of the form:

$$\text{cost} = \sum_{i=1}^{N} (w_1 \cdot |\text{wantedcrosspoint}_i - \text{bilinearcrosspoint}_i| + w_2 \cdot |(\text{texel}_{ib} - \text{texel}_{ia}) - \sin\theta_i|) \cdot \sin^2\theta_i$$

where:

$w_1$ and $w_2$ are weighting values that can be selected and varied as desired, for example iteratively to test varying optimisations;

i is the texel pair for which the cost function is being tested;

N is the total number of texel pairs over which the cost function is evaluated and summed;

$\theta_i$ is the crossing angle of the curve for the ith texel pair;

texel$_{ia}$ and texel$_{ib}$ are the respective texel values for the texels of the ith texel pair;

wantedcrosspoint$_i$ is the point on the line joining the ith pair of texels where the true curve crosses; and bilinearcrosspoint$_i$ is the point on the line joining the ith pair of texels where the result of bilinear filtering with the given texel values will return the defined threshold curve value (in this case 0.5) and thus is:

$$\text{bilinearcrosspoint}_i = \frac{\text{threshold} - \text{texel}_{ia}}{\text{texel}_{ib} - \text{texel}_{ia}}$$

This equation is derived by solving threshold=bilinear(bilinearcrosspoint, 0) for bilinearcrosspoint$_i$.

In effect, in this cost function, the factor:

|wantedcrosspoint$_i$−bilinearcrosspoint$_i$| represents the absolute value of the difference between the crossing point of the curve as determined when the texel values are sampled, and the wanted crossing point of the curve;

the factor:

|texel$_{ib}$−texel$_{ia}$|−sin θ$_i$ ensures the full range of available texel values is used (prevents the solution from collapsing all the assigned texel values to the threshold value (0.5 in this case)); and the factor:

sin$^2$ θ$_i$ causes edges where the curve is almost parallel to the line between the texels to have less weight in the cost function (and vice-versa).

This cost function is then minimised to find the optimum texel values, texel$_{ia}$, texel$_{ib}$ to use for each texel pair. In the present embodiment this is done using simulated annealing, although other optimisation algorithms can be used if desired. The determined texel values are then stored as a graphics texture representing the smooth curve.

In the present embodiment, this process is repeated for plural different smooth curves and/or parts of a given smooth curve, so as to build up a set of texture maps representing a plurality of different smooth curves.

The smooth curves that are represented in a texture in the present embodiment comprise curves that are continuous and whose first derivatives are piecewise continuous. They may be, for example, bezier curves, spline curves, and/or arcs.

Textures that represent one or more reference or "canonical" curves are also generated and used. (As discussed above, a "canonical curve" is a reference or fundamental curve that all curves within a given family of curves can be transformed onto using an affine transformation.)

Figure 3:
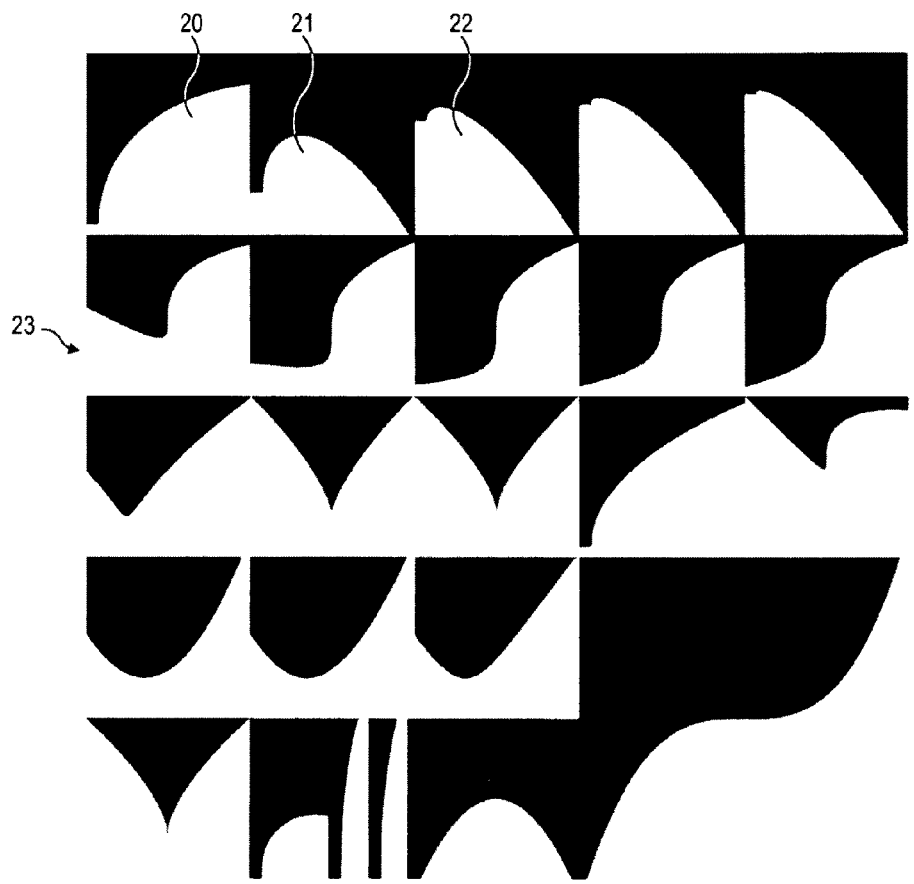
FIG. 3 shows schematically the storing of textures representing plural smooth curves in a single texture map.

In the present embodiment, a given texture map is used to store texture representations of plural different smooth curves and parts of smooth curves by spatially separating the different curves in the texture. FIG. 3 illustrates this and shows plural smooth curves 20, 21, 22, etc., stored in a single overall texture 23. By sampling the appropriate region of the texture 23, the smooth curve represented there can be drawn.

Figure 4:
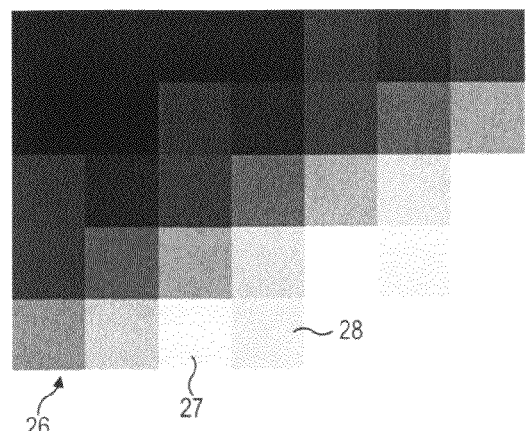
FIG. 4 shows schematically an enlarged section of the contour region of a curve in the texture of FIG. 3.

FIG. 4 shows schematically an enlarged section 24 of the curve contour region 26 of one of the curves stored in the texture 23 shown in FIG. 3. As can be seen, the texel values around the contour 26 vary to either side of the curve contour, including some texels 27 closer to the contour 26 of the curve that have higher (lighter) values than texels 28 that are further from the curve contour 26 on the side of the curve that is represented by values higher than the curve's threshold value, and vice-versa. This is so as to ensure that when the curve is bi-linearly sampled, the desired texture values are returned.

Storing textures representing different smooth curves as different parts of the same texture map allows many curves to be stored in a single texture, and can reduce, e.g., the number of texture changes needed to render smooth curves when using the present invention.

Indeed, the applicants have found that in practice most, if not all, smooth curve sections that may need to be drawn in graphics processing can be represented by relatively few families of curves, such that it is readily possible to represent all those desired curves using relatively few textures.

Once a set of textures representing a set of smooth curves has been generated in this manner, and stored for use by a graphics processing system, the textures can then be used to draw shapes defined by the smooth curves (i.e. shapes having curves corresponding to the smooth curves as their edges (boundaries)). This is basically done by generating primitives covering the scene (display) area where the shape is to be drawn and then applying the appropriate texture to the primitive to draw the shape.

When the texture is applied to the primitive, texture values are sampled for sampling points within the primitive and the sampled texture values used to conditionally draw (shade) the sample position as being inside the curve (i.e., in practice, inside the edge or boundary of the shape defined by the curve) (if the sampled texture value is less than the curve's threshold value or vice-versa) or discard the sample position as being outside the curve (shape) (if the sampled texture value is greater than or equal to the curve's threshold value or vice-versa).

Figure 5:
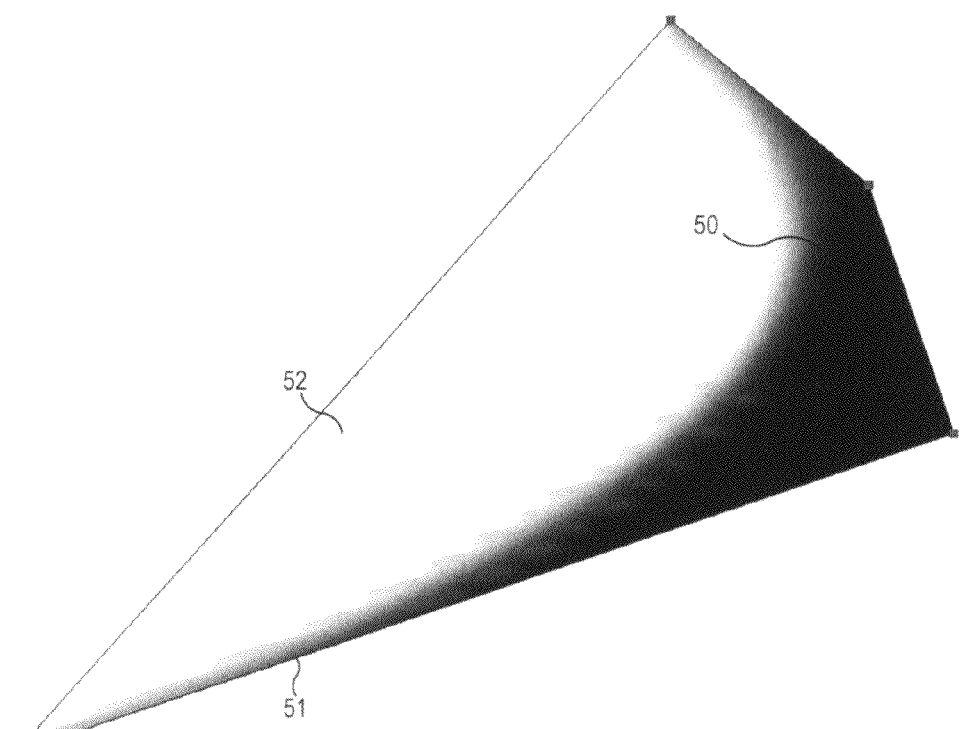
FIG. 5 shows schematically the application of a texture such as that shown in FIG. 1 to a graphics primitive.

FIG. 5 illustrates this and shows schematically the application of a texture representing a curve 50 to a primitive 51. In this case the lighter coloured region 52 of the primitive 51 is drawn as falling inside the curve 50.

A preferred embodiment of the process for rendering a shape using a texture in the present embodiment will now be described in more detail.

Firstly, the graphics processing system identifies the need to render a "smooth" shape. It then generates in the normal fashion a primitive or primitives that cover the screen area where the smooth shape is to be displayed. In the present embodiment, triangles that cover the convex hull of the control points of the curve defining the edge of the shape to be drawn are generated.

These primitives are then rasterised in the normal manner to fragments that are passed to the shading pipeline for shading. (If, as can happen, rasterising the primitives doesn't generate any fragments (as the primitives don't in fact cover any sampling points of the scene as it will be displayed), then the process can stop here, as this means that the shape will not actually be seen in the scene as it will be displayed.)

The texture map (or part of the texture map) that corresponds to the smooth curve defining the edge of the shape to be drawn is then applied to the primitive or primitives by, as is known in the art, taking texture samples from the texture representing the smooth curve for the positions of the sampling point or points in the scene that the primitive(s) covers. In the present embodiment, a single texture look-up is done per fragment. (Other arrangements would, of course, be possible.)

Each sampled texture value is then compared to the threshold texture value defined for the curve and the sample position then either drawn (rendered) as falling inside the curve (and thus shape) or discarded as falling outside the curve, in dependence on the result of the comparison. The texture samples are taken using bi-linear filtering (with bi-linearing filtering enabled), as the texture map is, in this embodiment, as discussed above, tailored to sampling using bi-linear filtering.

The comparison of the sampled texture value and the curve threshold value can be performed in fixed-function graphics hardware using the graphics "alpha test", with the comparison alpha value for the alpha test set to the curve threshold value (in this case, 0.5), so as to discard sampling points and/or fragments that fall outside the curve. With programmable shader hardware, the comparison can be carried out using, for example, a compare and conditional discard routine.

In the present embodiment, a greater than or equal to (>=) test is used for the compare and discard test. The results of this test are then stored in the stencil buffer and used when applying shading to draw the curve in a later processing pass. (It would, of course, equally be possible to do the shading in the same pass as the curve testing.)

As will be appreciated by those skilled in the art, there may be situations where the shape (the curve defining the edge of the shape) to be drawn does not match exactly to a curve as it is stored in a texture. In this case, the shape (curve) to be drawn must be mapped to the curve as it is stored in the texture, so that the texture representing the curve can then be applied (sampled) appropriately. Similarly, the sampling positions within the image being rendered must be mapped to appropriate sampling positions within the texture representing the curve, again so that the shape (curve) can be drawn correctly.

In the present embodiment, the process of mapping the curves inscribed in textures onto the image to be displayed is done by calculating the texture coordinates for the control points defining the curve of the input shape to be drawn and then linearly interpolating the texture coordinates over the curve using the interpolation hardware of the graphics processor.

In the case of a quadratic curve, each input curve should be just an affine transformed version of the curve stored in the texture. Thus, in the present embodiment the entire curve is used each time, so that fixed texture coordinates can be used for each of the control points, and the necessary transform implicitly defined by pairing control points in surface space with the texture coordinates (in texture space).

For cubic curves, the curve is preferably first classified as a serpentine, loop, cusp, "cusp-at-infinity" (i.e. a curve with a cusp with an inflation point infinitely far away), degenerate, or parabola curve. A parabola curve is a quadratic curve and is handled as such. A degenerate curve is handled by splitting it into one or more lines.

For the other curves, the inflection points (infl0 and infl1) of the curve are calculated. The stored curves (textures) are configured so that their inflection points are always at −1 and 1, and so the linear transformation from [infl0 ... infl1]→[−1 ... 1] can be calculated. With this, the parametric location of the start and end point (0 and 1) of the input curve can be transformed to their locations in the texture space. The parametric range in the canonical texture space that the texture needs to cover is now known.

For loop curves and serpentine curves, the stored textures are then searched to find a texture (e.g. the most zoomed-in texture) that covers the parametric range needed. (This is not necessary for cusp and cusp-at-infinity curves.)

The selected stored curve (texture) (with inflection points at −1 and 1) is then rescaled to map the inflection points to the inflection points of the input curve infl0 and infl1. This transformation is then applied to the control points of the stored curve to give the appropriate transformed control point positions, which are then used as texture coordinates for the corresponding control points of the input curve.

Where multiple curves are packed into a texture, it may be necessary to apply a transformation to the texture coordinates so as to sample the correct subset of the texture. This is done in the present embodiment by calculating the scaling and translation required to transform the box [0 ... 1]×[0 ... 1]→[u_1 ... u_2]×[v_1 ... v_2] and applying the transformation to texture coordinates that have been calculated as if the curve covered the entire texture.

Figure 6:
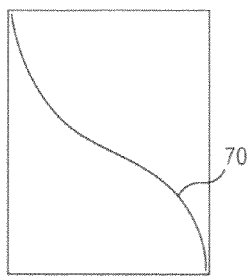
FIG. 6 shows schematically the rendering of a smooth curve for display in an embodiment of the present invention.
Figure 6:
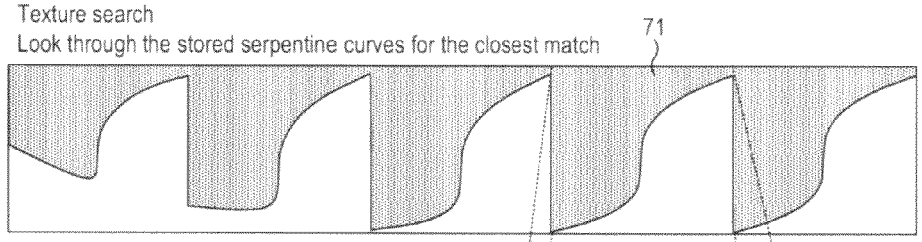
Figure 6:
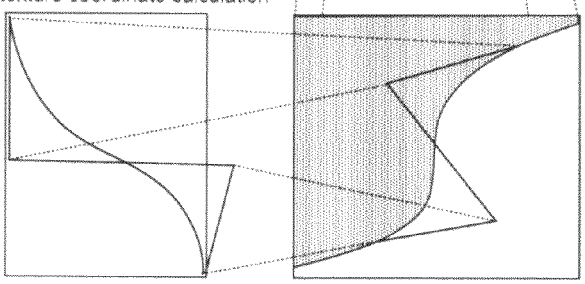
Figure 6:
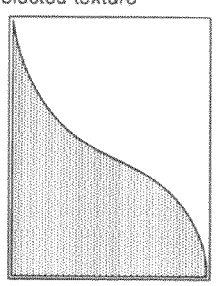

FIG. 6 illustrates these processes, and shows schematically the moving of a curve defining a shape to be drawn through classification, texture search, texture coordinate calculation and rendering stages.

As shown in FIG. 6, a given input smooth curve defining a shape to be drawn 70 is first classified at step a). In this example, the classification identifies the curve as a "serpentine curve".

The system then searches through the stored textures 71 representing serpentine curves to find the stored serpentine curve with the closest match to the input curve 70 (step b)).

Once this is done, the necessary texture coordinate calculation and primitive generation to map the input curve 70 to the stored curve in the texture 71 is carried out as shown at step c) in FIG. 6.

Finally, the input curve is rendered using the selected texture as shown at step d) in FIG. 6.

In the present embodiment, it is also possible to split a given input curve (shape) to be drawn into separate sections, with each section then being drawn separately (e.g. using different textures or different parts of the same texture). This may be done for a bezier curve, for example, using de Casteljau's algorithm. Other suitable algorithms could, of course, be used if desired.

In the present embodiment, such splitting of a shape (curve) to be drawn is done when drawing very large shapes, so as to split them into smaller shapes in order to reduce rendering artefacts. Similarly, self-intersecting shapes, such as shapes defined by curves with loops in them, are split into two (or more) shapes that are not self-intersecting, which shapes are then drawn (rendered) separately.

Such splitting of a curve (shape) to be drawn is also done to split curves that have singular points (cusps), at the singular points, so as to avoid the singular points in the curves causing rendering errors.

Figure 7:
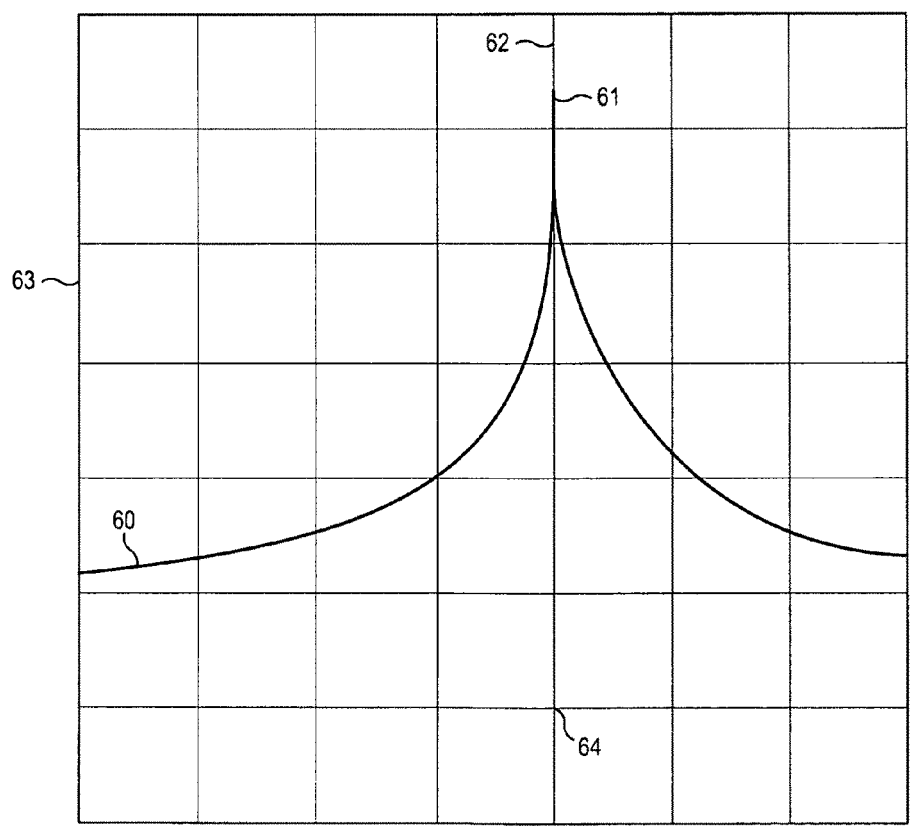
FIG. 7 shows schematically the representation of a curve containing a cusp in a graphics texture in one embodiment of the present invention.

(An alternative mechanism for improving the handling of singular points in curves is to ensure that when the curve is represented in the texture, all the singular points fall on the grid of horizontal and vertical lines that join the texels. FIG. 7 illustrates this and shows a cusp curve 60 represented in a texture 63 such that the singular point 61 of the cusp lies on the grid line 62 joining the centres 64 of the texels.)

As discussed above, and as will be appreciated from the above, the effect of rendering a smooth curve in the manner of the present invention is to draw a shape that has the curve as its edge or boundary (since points on one side of the curve are drawn (rendered) differently to points on the other side of the curve). For example, as can be seen from FIG. 3, the textures that are used in the present invention can be viewed as representing a shape that has the curve in question as its edge or boundary or contour.

The present embodiment and invention therefore can effectively be considered to render shapes that have the relevant curve as their edge or boundary, and/or that have the relevant curve as a contour or boundary (i.e. such that points on different sides of the curve should be drawn differently).

It can be seen from the above that the present invention, in its preferred embodiments at least, provides a method and system for the effective rendering of shapes defined by smooth curves that can be used, inter alia, on lower-cost, fixed function 3D graphics hardware and on unmodified, existing hardware graphics accelerators. This allows, for example, newer curve rendering APIs and applications to be hardware-accelerated using lower cost, and/or fixed function graphics hardware.

Thus, the present invention can be implemented using only "basic" graphics hardware. It also uses significantly less CPU time and rendering bandwidth, and thus power, when compared, e.g., to existing sub-division approaches for rendering smooth curves.

This is achieved, in the preferred embodiments of the present invention at least, by representing smooth curves as graphics textures and then using graphics texture mapping to render shapes defined by the curves.

The invention claimed is:

1. A method of rendering a shape defined by a smooth curve in a graphics processing system, the method comprising:
applying a graphics texture representing a curve corresponding to the curve defining the shape to at least one primitive to be rendered by sampling texture values in the texture for sampling positions within the at least one primitive; and
using the sampled texture values to determine which side of the curve the sampling positions should be treated as being on; wherein:
the graphics texture is configured such that all positions in the texture on one side of the curve that the texture represents will return a sampled texture value that is less than a selected threshold value and all positions in the texture on the other side of the curve will return a sampled texture value that is greater than the selected threshold value; and the method comprises:
comparing the sampled texture values for the sampled sampling positions of the at least one primitive to the selected threshold texture value for the curve to determine which side of the curve the sampled sampling positions of the at least one primitive should be treated as being on; and wherein:
the texture is configured such that the texture will represent the smooth curve most accurately when the texture is sampled using a particular, selected texture filtering process; and the method comprises:
sampling the texture values in the texture using the particular, selected texture filtering process that the texture is configured for.

2. The method of claim 1, wherein the texture representing the smooth curve is tailored for sampling using bi-linear filtering.

3. The method of claim 1, comprising:
splitting a shape to be rendered into at least two separate shapes; and
rendering each separate shape that the shape is split into separately.

4. A method of generating a texture for use in a graphics processing system for rendering a shape defined by a smooth curve, the method comprising:
generating a graphics texture map comprising an array of texture texels for representing a smooth curve, by:
setting the texel values in the texture map such that texture samples taken from positions in the texture map that lie on one side of the smooth curve that the texture is to represent will return texture values that are less than a threshold texture value, and such that texture samples taken from positions that lie on the other side of the smooth curve will return texture values that are greater than the threshold texture value; and
selecting the texel values to be used for at least some of the texels of the texture on the basis of a particular texture filtering process that is intended to be used when sampling the texture.

5. The method of claim 4, wherein at least some of the texel values to use for the texture are determined by using a cost function that represents the particular texture filtering process and then minimising that cost function using at least one optimisation algorithm.

6. The method of claim 4, comprising:
determining at least some of the texel values to use for the texture by minimising a cost function that is representative of respective errors between the position of the smooth curve that the texture is to represent as it lies in the texture and the indicated position of the curve when the texels of the texture are sampled using a particular texture sampling process.

7. The method of claim 4, wherein the values of at least some of the texels stored in the texture map representing the smooth curve are selected on the basis that bi-linear filtering will be used to sample the texture.

8. An apparatus for rendering a shape defined by a smooth curve in a graphics processing system, the apparatus comprising:
memory for storing at least one graphics textures that represents at least one smooth curve, wherein the stored values for each texture are set such that the texture will represent the smooth curve most accurately when the texture is sampled using a particular, selected texture filtering process;
processing circuitry arranged to apply a graphics texture representing a smooth curve to at least one primitive to be rendered by sampling texture values in the texture for sampling positions within the at least one primitive by using the particular texture filtering process that the texture is configured for; and
processing circuitry arranged to use a sampled texture value or values to determine which side of the curve a sampling position should be treated as being on; wherein
each texture is configured such that sampling any position in the texture on one side of a curve that the texture represents will return a sampled texture value that is less than a selected threshold value and sampling any position in the texture on the other side of the curve will return a sampled texture value that is greater than the selected threshold value; and
the apparatus comprises:
processing circuitry arranged to compare the sampled texture values for the sampled sampling positions of the at least one primitive to the selected threshold texture value for a curve to determine which side of the curve the sampled sampling positions of the at least one primitive should be treated as being on.

9. The apparatus of claim 8, wherein the one or more textures representing the smooth curves are tailored for sampling using bi-linear filtering.

10. The apparatus of claim 8, comprising:
processing circuitry arranged to split a shape to be rendered into at least two separate shapes; and
processing circuitry arranged to render each separate shape that the shape is split into separately.

11. An apparatus for generating a texture for use in a graphics processing system for rendering a shape defined by a smooth curve, the apparatus comprising:
processing circuitry arranged to generate a graphics texture map comprising an array of texture texels for representing a smooth curve, comprising:
processing circuitry arranged to set the texel values in the texture map such that texture samples taken from positions in the texture map that lie on one side of the smooth curve that the texture is to represent will return texture values that are less than a threshold texture value, and such that texture samples taken from positions that lie on the other side of the smooth curve will return texture values that are greater than the threshold texture value; and processing circuitry arranged to select the texel values to be used for at least some of the texels of the texture on the basis of a particular texture filtering process that is intended to be used when sampling the texture.

12. The apparatus of claim 11, comprising:
processing circuitry arranged to determine at least some of the texel values to use for the texture by using a cost function that represents the particular texture filtering process and then minimising that cost function using at least one optimisation algorithm.

13. The apparatus of claim 11, comprising:
processing circuitry arranged to determining at least some of the texel values to use for the texture by minimising a cost function that is representative of respective errors between the position of the smooth curve that the texture is to represent as it lies in the texture and the indicated position of the curve when the texels of the texture are sampled using a particular texture sampling process.

14. The apparatus of claim 11, comprising:
processing circuitry arranged to set the values of at least some of the texels stored in the texture map representing the smooth curve on the basis that bi-linear filtering will be used to sample the texture.

15. A graphics texture map for use in a graphics processing system for rendering a shape defined by a smooth curve, the texture map comprising:
an array of texture texels, in which:
the texel values are set such that texture samples taken from positions in the texture map that lie on one side of a smooth curve that the texture is to represent will return texture values that are less than a threshold texture value, and such that texture samples taken from positions that lie on the other side of the smooth curve will return texture values that are greater than the threshold texture value; and
the texel values for the texture are further set such that the texture will represent the smooth curve most accurately when the texture is sampled using a particular, selected texture filtering process.

16. One or more computer-readable storage media comprising computer software code to perform the method of rendering a shape defined by a smooth curve as claimed in claim 1 when executed on a data processor of a graphics processing system.

17. One or more computer-readable storage media comprising computer software code to perform the method of generating a texture for use in a graphics processing system as claimed in claim 1 when executed on a data processor.

18. The method of claim 1, wherein the texture is configured such that the texel values in the vicinity of the threshold value contour of the curve that the texture represents vary over a range of values, but texels on a given side of the curve at a greater distance from the threshold value contour of the curve each have the same texel value.

19. The apparatus of claim 8, wherein each texture is configured such that the texel values in the vicinity of the threshold value contour of the curve that the texture represents vary over a range of values, but texels on a given side of the curve at a greater distance from the threshold value contour of the curve each have the same texel value.

20. The method of claim 1, wherein at least some texel values in the graphics texture have been selected in accordance with the particular texture filtering process that is intended to be used when sampling the texture by using a cost function that considers a path of the curve between the texels in the texture and tries to optimize the values of at least some of the texels so that points where the path of the curve lies between the texels in the texture will return the threshold texture value for the curve when the texture is sampled using the particular texture filtering process.

21. The method of claim 4, further comprising selecting the texel values to be used for at least some of the texels of the texture on the basis of the particular texture filtering process that is intended to be used when sampling the texture by using a cost function that considers a path of the curve between the texels in the texture and tries to optimize the values of the texels so that points where the path of the curve lies between the texels in the texture will return the threshold texture value for the curve when the texture is sampled using the particular texture filtering process.

22. The apparatus of claim 8, wherein the stored values for each texture are set using a cost function that considers a path of the curve between texels in the texture and tries to optimize values of at least some of the texels so that points where the path of the curve lies between the texels in the texture will return the threshold texture value for the curve when the texture is sampled using the particular texture filtering process.

23. The apparatus of claim 11, wherein the processing circuitry arranged to select the texel values to be used for at least some of the texels of the texture on the basis of a particular texture filtering process that is intended to be used when sampling the texture is arranged to select the texel values to be used for at least some of the texels of the texture by using a cost function that considers a path of the curve between the texels in the texture and tries to optimize the values of the texels so that points where the path of the curve lies between the texels in the texture will return the threshold texture value for the curve when the texture is sampled using the particular texture filtering process.

24. The graphics texture map of claim 15, wherein the texel values for the texture are set using a cost function that considers a path of the curve between texels in the texture and tries to optimize values of at least some of the texels so that points where the path of the curve lies between the texels in the texture will return the threshold texture value for the curve when the texture is sampled using the particular texture filtering process.

* * * * *